United States Patent
Toyama et al.

(10) Patent No.: US 11,390,369 B2
(45) Date of Patent: Jul. 19, 2022

(54) AIRCRAFT

(71) Applicant: PANASONIC INTELLECTUAL PROPERTY MANAGEMENT CO., LTD., Osaka (JP)

(72) Inventors: Masayuki Toyama, Kanagawa (JP); Naoto Yumiki, Osaka (JP); Atsuhiro Tsuji, Osaka (JP); Hiroyuki Matsumoto, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 251 days.

(21) Appl. No.: 16/116,414

(22) Filed: Aug. 29, 2018

(65) Prior Publication Data
US 2018/0362133 A1 Dec. 20, 2018

Related U.S. Application Data

(63) Continuation of application No. PCT/JP2017/005207, filed on Feb. 14, 2017.

(30) Foreign Application Priority Data

Mar. 10, 2016 (JP) .............................. JP2016-047673

(51) Int. Cl.
*B64B 1/30* (2006.01)
*A63H 27/00* (2006.01)
(Continued)

(52) U.S. Cl.
CPC ............... *B64B 1/30* (2013.01); *A63H 27/00* (2013.01); *B64B 1/46* (2013.01); *B64C 13/20* (2013.01);
(Continued)

(58) Field of Classification Search
CPC ......... B64C 13/20; B64C 27/08; B64C 39/00; B64C 2201/101; B64C 2201/108;
(Continued)

(56) References Cited

U.S. PATENT DOCUMENTS 5,071,383 A 12/1991 Kinoshita
9,321,531 B1 * 4/2016 Takayama ............. B64C 39/024
(Continued)

FOREIGN PATENT DOCUMENTS

JP 04-022386 A 1/1992
JP 2005-271831 A 10/2005
(Continued)

OTHER PUBLICATIONS

International Search Report and Written Opinion dated Apr. 11, 2017 in International Application No. PCT/JP2017/005207; with partial English translation.

*Primary Examiner* — Nicholas McFall
(74) *Attorney, Agent, or Firm* — McDermott Will & Emery LLP

(57) ABSTRACT

An aircraft includes: a plurality of rotor units each including a propeller and a motor that drives the propeller; a balloon that laterally covers the plurality of rotor units, across the height of the plurality of rotor units in the up-and-down direction; a camera that protrudes, along a predetermined axis, beyond the balloon; and a holding component that holds the camera and whose overall length can be shortened along the predetermined axis.

15 Claims, 21 Drawing Sheets

(51) Int. Cl.
  *B64D 25/00* (2006.01)
  *B64D 47/08* (2006.01)
  *B64C 39/02* (2006.01)
  *B64C 27/08* (2006.01)
  *B64C 13/20* (2006.01)
  *B64B 1/46* (2006.01)

(52) U.S. Cl.
  CPC .............. *B64C 27/08* (2013.01); *B64C 39/02* (2013.01); *B64D 25/00* (2013.01); *B64D 47/08* (2013.01); *B64C 2201/022* (2013.01); *B64C 2201/127* (2013.01)

(58) Field of Classification Search
  CPC ........ B64C 2201/022; B64C 2201/027; B64B 1/30; B64B 1/34; B64B 1/32; B64B 1/26; B64D 25/00
  See application file for complete search history.

(56) References Cited

U.S. PATENT DOCUMENTS

| | | | |
|---|---|---|---|
| 10,000,284 B1* | 6/2018 | Purwin | G05D 1/104 |
| 2007/0102570 A1* | 5/2007 | Luffman | B64B 1/22 |
| | | | 244/30 |
| 2008/0011900 A1* | 1/2008 | Quintana | B64C 11/006 |
| | | | 244/30 |
| 2012/0234969 A1* | 9/2012 | Savoye | A63H 27/12 |
| | | | 244/17.13 |
| 2017/0137104 A1 | 5/2017 | Nakamura | |
| 2017/0274995 A1* | 9/2017 | Yamada | B64C 25/34 |
| 2018/0147429 A1* | 5/2018 | Won | B60F 5/02 |
| 2019/0002093 A1* | 1/2019 | Muramatsu | B64B 1/34 |
| 2019/0291858 A1* | 9/2019 | Li | B64C 27/08 |

FOREIGN PATENT DOCUMENTS

| | | | | |
|---|---|---|---|---|
| JP | 2011-046355 A | | 3/2011 | |
| JP | 2016-016774 A | | 2/2016 | |
| JP | 5875093 B1 | | 3/2016 | |
| JP | 6037190 B1 | * | 12/2016 | ............... B64B 1/14 |

\* cited by examiner

AIRCRAFT

CROSS REFERENCE TO RELATED APPLICATIONS

This application is a U.S. continuation application of PCT International Patent Application Number PCT/JP2017/005207 filed on Feb. 14, 2017, claiming the benefit of priority of Japanese Patent. Application Number 2016-047673 filed on Mar. 10, 2016, the entire contents of which are hereby incorporated by reference.

BACKGROUND

1. Technical Field

The present disclosure relates to an aircraft including a plurality of rotor units.

2. Description of the Related Art

Japanese Unexamined Patent Application Publication No. 2011-046355 discloses an aircraft including a plurality of rotor units that each include a propeller. This type of aircraft is referred to as, for example, a multicopter or drone.

Japanese Unexamined Patent Application Publication No. H04-022386 discloses an aircraft including: a single rotor unit including a propeller; and a buoyant body filled with helium gas. In the aircraft disclosed in Japanese Unexamined Patent Application Publication No. H04-022386, the donut-shaped buoyant body is disposed so as to surround the surrounding area of the single rotor unit.

SUMMARY

In the aircraft disclosed in Japanese Unexamined Patent Application Publication No. 2011-046355, the plurality of rotor units and the fuselage, which is equipped with on-board devices such as a camera, are exposed. The aircraft disclosed in Japanese Unexamined Patent. Application Publication No. H04-022386 achieves flight with a single rotor unit including a large propeller. The aircraft therefore includes, protruding beyond the buoyant body, legs for supporting the weight of rotor unit when landing and fins for controlling flight direction. Accordingly, if either of these aircrafts experience an unexpected flight situation, descend and contact an object, the object contacted by the aircraft may be damaged and the on-board devices in the aircraft may be damaged.

The present disclosure has been conceived in view of the above points, and provides an aircraft that achieves flight via a plurality of rotor units and has improved safety.

An aircraft according to the present disclosure includes: a plurality of rotor units each including a propeller and a motor that drives the propeller; a shock absorber that laterally covers the plurality of rotor units, across the height of the plurality of rotor units in the up-and-down direction; an on-board device that protrudes, along a predetermined axis, beyond the shock absorber; and a holding component that holds the on-board device and whose overall length can be shortened along the predetermined axis.

With the aircraft according to the present disclosure, it is possible to cause an aircraft that contains gas that is less dense than air to quickly descend when the aircraft becomes uncontrollable.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Hereinafter, embodiments will be described in detail with reference to the drawings when appropriate. However, unnecessarily detailed description may be omitted. For example, detailed descriptions of well-known matters or descriptions of components that are substantially the same as components described previous thereto may be omitted. This is to avoid unnecessary redundancy and provide easy-to-read descriptions for those skilled in the art.

Note that the accompanying drawings and subsequent description are provided by the inventors to facilitate sufficient understanding of the present disclosure by those skilled in the art, and are thus not intended to limit the scope of the subject matter recited in the claims.

Embodiment 1

(Outline of Aircraft Configuration)

Next, aircraft 10 according to Embodiment 1 will be described.

Figure 1:
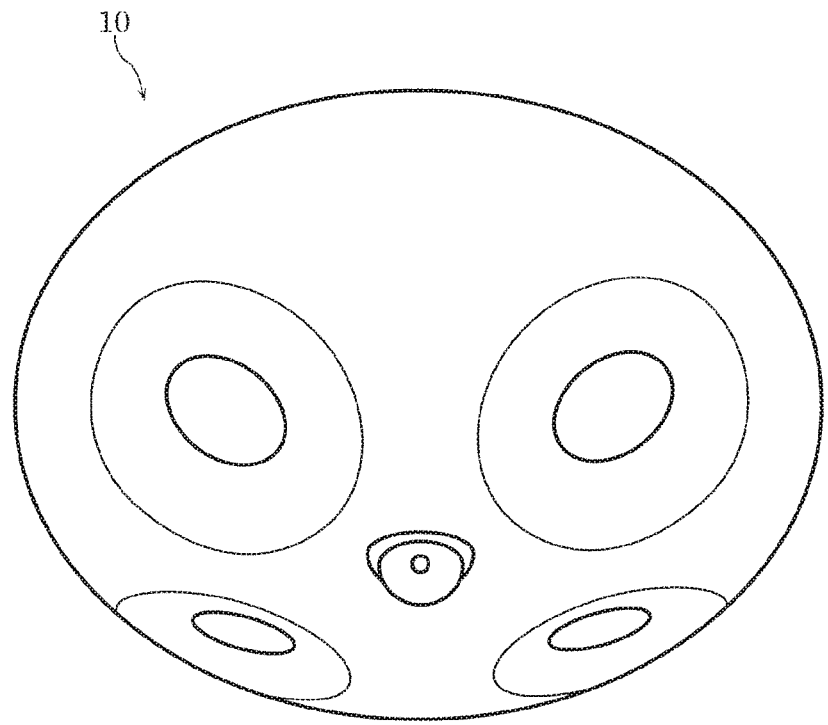
FIG. 1 is a perspective view of an aircraft according to Embodiment 1 from below.
Figure 2:
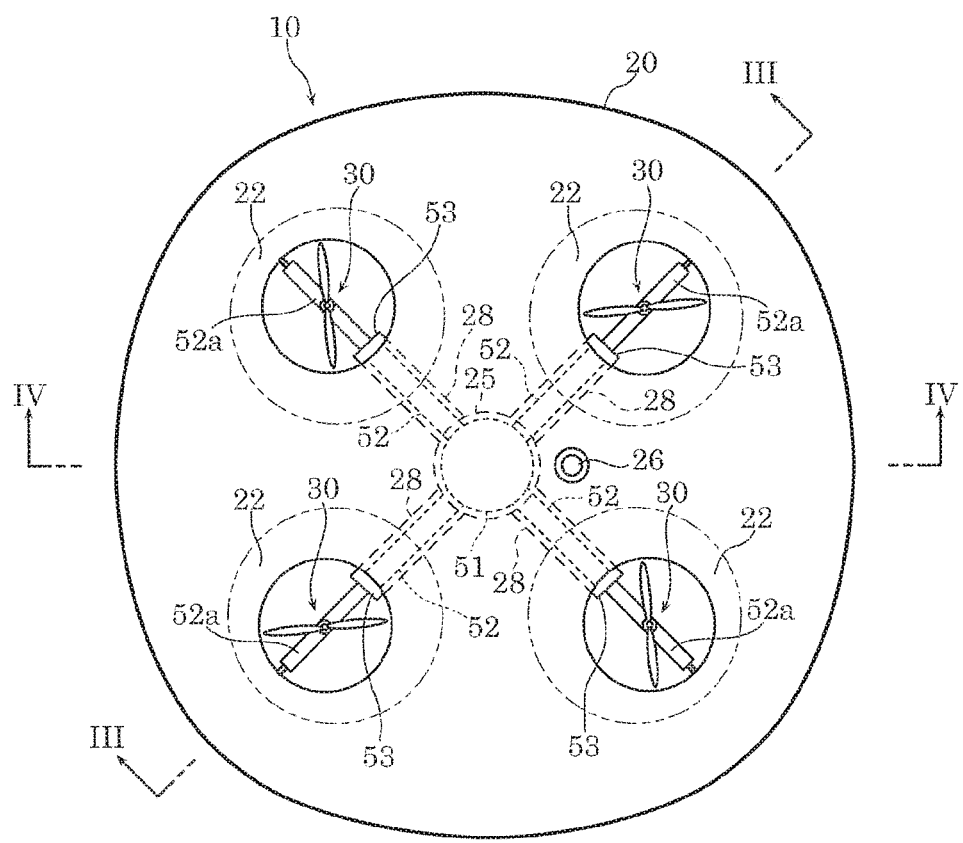
FIG. 2 is a plan view of the aircraft according to Embodiment 1.
Figure 3:
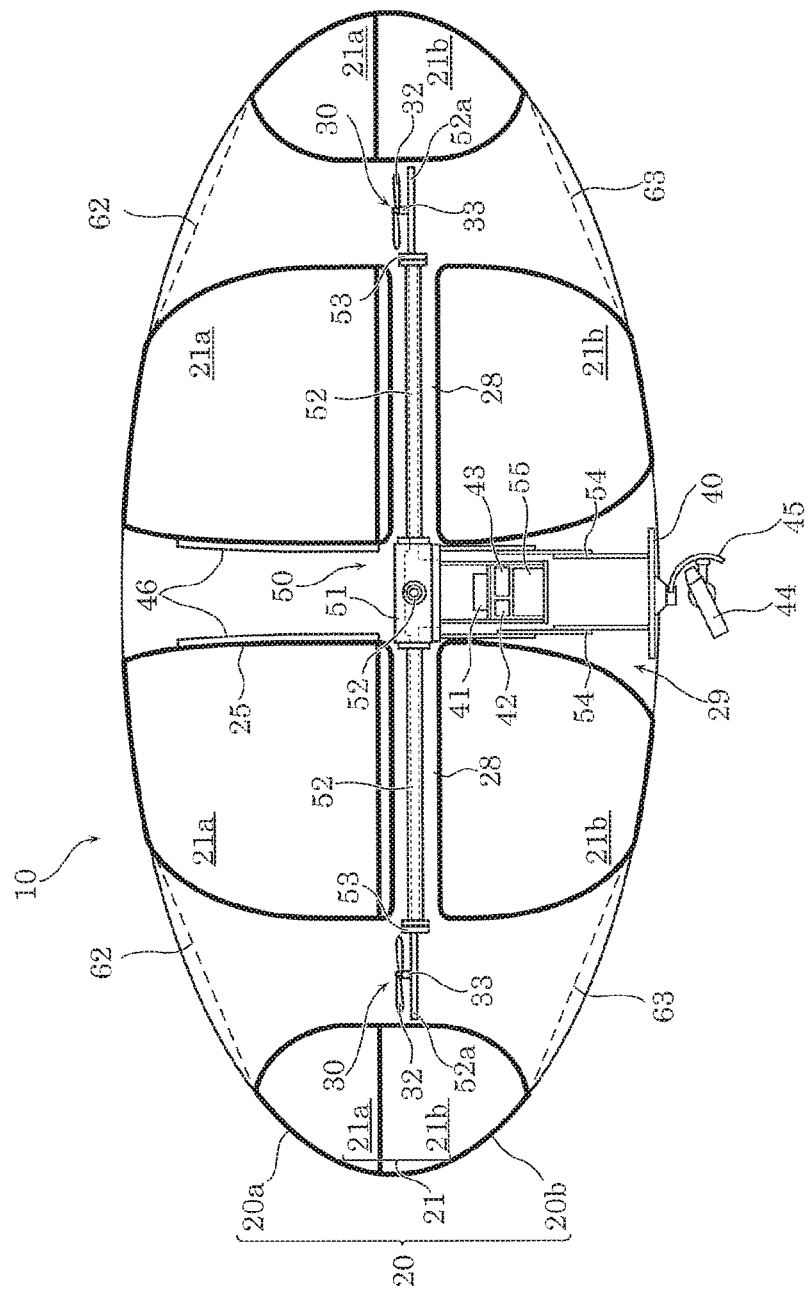
FIG. 3 is a cross-sectional view of the aircraft taken at line III-III in FIG. 2.
Figure 4:
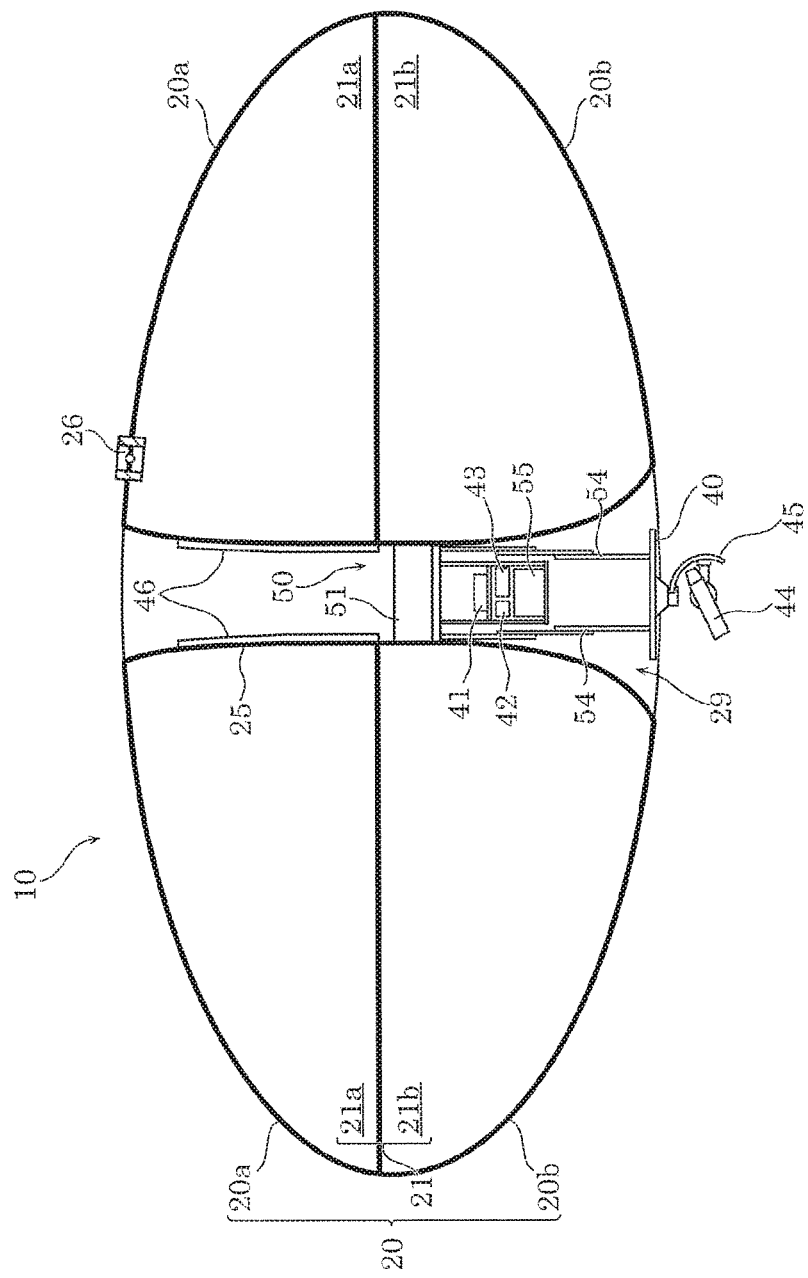
FIG. 4 is a cross-sectional view of the aircraft taken at line IV-IV in FIG. 2.

FIG. 1 is a perspective view of an aircraft according to Embodiment 1 from below. FIG. 2 is a plan view of the aircraft according to Embodiment 1. FIG. 3 is a cross-sectional view of the aircraft taken at line Ill-III in FIG. 2. FIG. 4 is a cross-sectional view of the aircraft taken at line IV-IV in FIG. 2.

As illustrated in FIG. 1 and FIG. 2, aircraft 10 according to this embodiment includes balloon 20 as a shock absorber, four rotor units 30, and fixing component 50. Aircraft 10 further includes release unit 26 that is disposed on the upper part of first shock absorber 20a of balloon 20 and releases a first gas contained in balloon 20 at a predetermined timing.

As illustrated in FIG. 3 and FIG. 4, aircraft 10 is provided with, as on-board devices, controller 41, battery 42, projector 43, and camera 44. Aircraft 10 is further provided with light emitter 46 (a lighting apparatus).

(Balloon)

Next, balloon 20 will be described.

Figure 5:
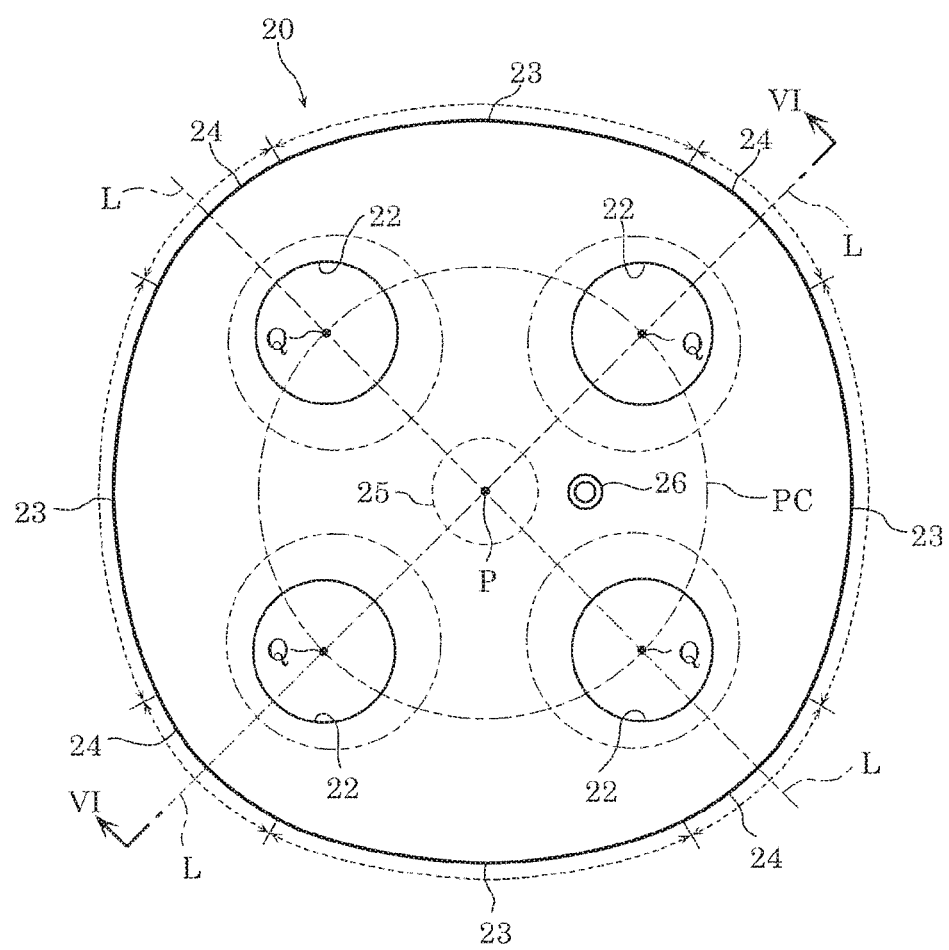
FIG. 5 is a plan view of the balloon according to Embodiment 1.
Figure 6:
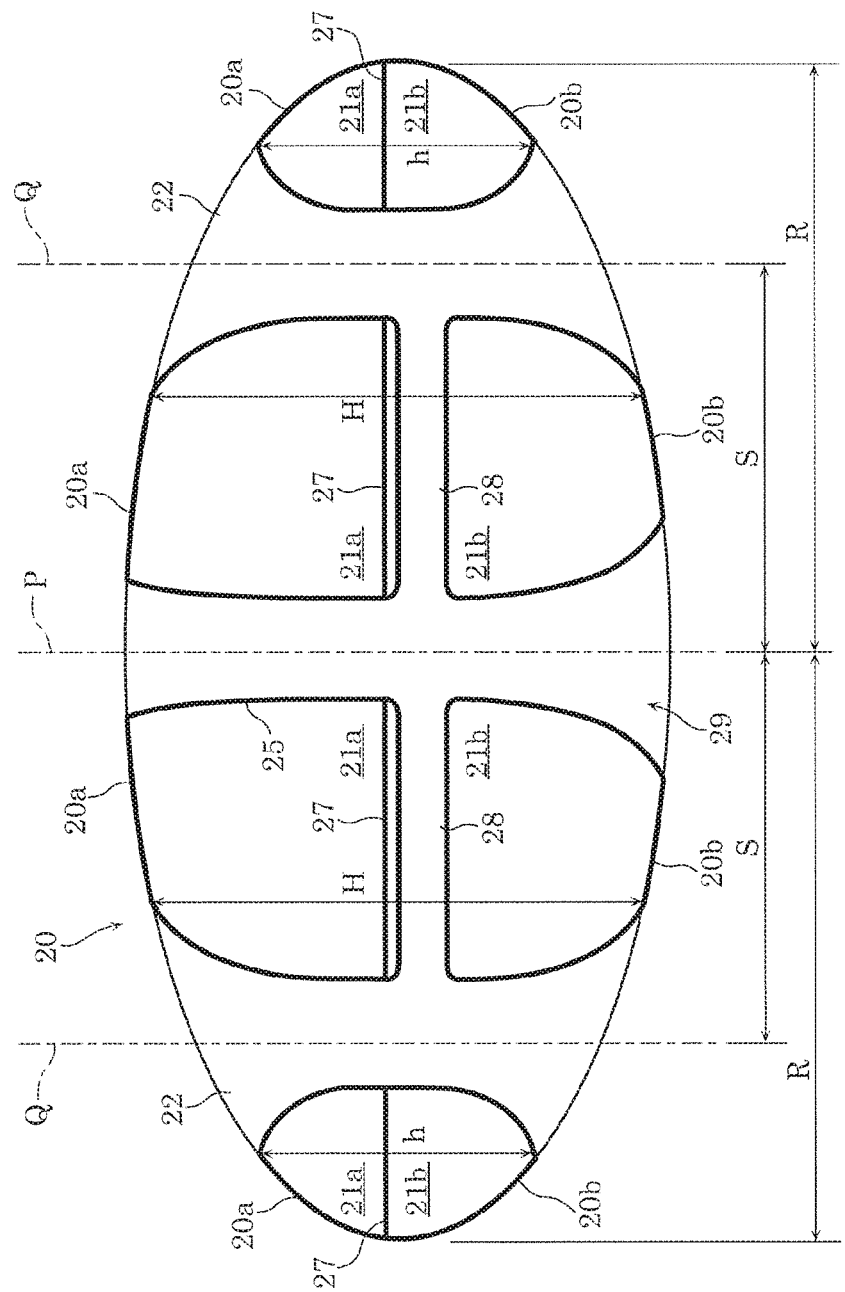
FIG. 6 is a cross-sectional view of the balloon taken at line VI-VI in FIG. 5.

FIG. 5 is a plan view of the balloon according to Embodiment 1. FIG. 6 is a cross-sectional view of the balloon taken at line VI-VI in FIG. 5.

As illustrated in FIG. 3, FIG. 4, and FIG. 6, balloon 20 is made of a flexible sheet material (for example, vinyl chloride), and includes gas chamber 21, which is a space enclosed by the sheet material. In FIG. 3, FIG. 4, and FIG. 6, the bold lines indicate the cross section of the sheet material that forms balloon 20. The sheet material that forms the outer surface of balloon 20 is white in color and semitransparent so as to allow light to pass through.

Gas chamber 21 includes first gas chamber 21a in the upper portion of aircraft 10 and second gas chamber 21b in the lower portion of aircraft 10. Stated differently, balloon 20 includes first shock absorber 20a functioning as a first chamber that defines first gas chamber 21a, and second shock absorber 20b functioning as a second chamber that defines second gas chamber 21b. First shock absorber 20a and second shock absorber 20b are mutually different shock absorbers. First gas chamber 21a defined by first shock absorber 20a and second gas chamber 21b defined by second shock absorber 20b are mutually independent from one another, and are not in fluid communication with one another. More specifically, partition 27 is disposed between and separates first gas chamber 21a and second gas chamber 21b. Partition 27 is made of the same sheet material used for balloon 20.

In gas chamber 21 made of the sheet material, first gas chamber 21a contains a first gas that is less dense than air, and second gas chamber 21b contains a second gas that is more dense than the first gas. In this embodiment, for example, the first gas is helium and the second gas is air.

As illustrated in FIG. 5, balloon 20 has rotational symmetry about an axis of symmetry extending in the up-and-down direction (line extending vertically out from the drawing in FIG. 5). This axis of symmetry is central axis P of balloon 20. Balloon 20 illustrated in FIG. 5 has a rotational symmetry of 90 degrees. In other words, balloon 20 has the same shape after each 90 degree rotation about central axis P.

As illustrated in FIG. 6, balloon 20 has a flattened shape. More specifically, the height axis of balloon 20 is flattened. Moreover, when viewed from a lateral side, balloon 20 has a streamline shape. Balloon 20 gradually decreases in height from its central region toward its peripheral edge. More specifically, in a cross section of balloon 20 taken along central axis P illustrated in FIG. 6, balloon 20 has an elliptical shape whose major axis extends horizontally and minor axis extends vertically. Stated differently, balloon 20 has a cross sectional shape that is approximately symmetrical about its horizontal axis. Note that the cross sectional shape of balloon 20 need not be a precise ellipse; it may be a shape that would be recognized as an ellipse at a glance.

Balloon 20 includes as many ventilation holes 22 as it does rotor units 30 (four in this embodiment). As illustrated in FIG. 6, each ventilation hole 22 is a passageway having an approximately circular cross section, and passes through balloon 20 in the up-and-down direction. Central axis Q of each ventilation hole 22 is approximately parallel to central axis P of balloon 20. Each ventilation hole 22 extends across first shock absorber 20a and second shock absorber 20b.

As illustrated in FIG. 6, central axis Q of each ventilation hole 22 is located between (i) a center point between central axis P of balloon 20 and the peripheral edge of balloon 20 and (ii) the peripheral edge of balloon 20. More specifically, the distance S between central axis P of balloon 20 and central axis Q of ventilation hole 22 is longer than half of the distance R between central axis P of balloon 20 and the peripheral edge of balloon 20 (S>R/2). Thus, rotor units 30 are located closer to the peripheral edge of balloon 20 than central axis P of balloon 20. Arranging rotor units 30 in this manner makes it possible to secure enough space between rotor units 30 and stably fly aircraft 10.

The cross sectional area of each ventilation hole 22 is smallest in the central region, in the up-and-down direction, of ventilation hole 22 (i.e., the area of a cross section taken perpendicular to central axis Q is smallest in the central region of ventilation hole 22). Each ventilation hole 22 has a shape that gradually expands in cross sectional area from the central region in the up-and-down direction toward the top end portion and from the vertical central region toward the bottom end portion. Stated differently, each ventilation hole 22 has the shape of a pillar with a pinched midsection. As described above, balloon 20 gradually decreases in height from its central region toward its peripheral edge. As such, with respect to each ventilation hole 22, the height h measured closer to the peripheral edge of balloon 20 is less than the height H measured closer to the central region of balloon 20.

As illustrated in FIG. 5, four ventilation holes 22 are arranged at 90 degree intervals around central axis P of balloon 20. Central axes Q of ventilation holes 22 are equidistant from central axis P of balloon 20. Stated differently, central axis Q of each ventilation hole 22 is approximately orthogonal to one pitch circle PC centered on central axis P of balloon 20.

As illustrated in FIG. 5, in a top view, the peripheral edge of balloon 20 includes reference curve sections 23 and small curvature radius sections 24. There are the same number of reference curve sections 23 as there are ventilation holes 22 and the same number of small curvature radius sections 24 as there are ventilation holes 22 (four in this embodiment). Reference curve sections 23 and small curvature radius sections 24 are alternately arranged around the peripheral edge of balloon 20 in a top view. Each small curvature radius section 24 is arranged outward of a different one of ventilation holes 22 (here, "outward" means on a side opposite central axis P of balloon 20). Each reference curve section 23 is disposed between two adjacent small curvature radius sections 24.

Reference curve sections 23 and small curvature radius sections 24 are both curved lines. The midpoint of the length (in the circumferential direction) of each small curvature radius section 24 is located on line L that intersects central axis Q of the closest ventilation hole 22 as well as central axis P of balloon 20 at right angles.

The radius of curvature of each small curvature radius section 24 is shorter than the radius of curvature of each reference curve section 23. However, the radius of curvature of each reference curve section 23 need not be constant throughout the length of reference curve section 23. The radius of curvature of each small curvature radius section 24 also need not be constant throughout the length of small curvature radius section 24. When the radius of curvature of reference curve sections 23 and small curvature radius sections 24 is not constant, the maximum radius of curvature of each small curvature radius section 24 may be less than the minimum radius of curvature of each reference curve section 23.

As illustrated in FIG. 6, balloon 20 includes a tubular coupler 25. Coupler 25 is made of a transparent sheet material shaped into a cylinder (or round tube) whose top and bottom end portions have a slightly increased diameter. Coupler 25 is disposed such that its central axis is approximately coaxial with central axis P of balloon 20. Inside balloon 20, the top end of coupler 25 is connected to the upper portion of balloon 20 and the bottom end of coupler 25 is connected to the lower portion of balloon 20.

The top end of the tubular coupler 25 is sealed, whereas the bottom end is open. The space inside coupler 25 is therefore in fluid communication with the space outside balloon 20. Air is present in the space inside coupler 25, and the pressure inside the space is essentially the same as the atmospheric pressure.

As described above, balloon 20 has rotational symmetry about central axis P extending in the up-and-down direction. The first gas, such as helium, that fills first gas chamber 21a of balloon 20 is evenly distributed throughout the entire first gas chamber 21a. Similarly, the second gas, such as air, that fills second gas chamber 21b of balloon 20 is evenly distributed throughout the entire second gas chamber 21b. Accordingly, the working point of the buoyant force (center of buoyancy) imparted by the first gas in balloon 20 is located approximately on central axis P of balloon 20.

As illustrated in FIG. 2, FIG. 4, and FIG. 5, aircraft 10 further includes release unit 26 that is disposed on the upper portion of first shock absorber 20a of balloon 20 and releases the first gas contained in first gas chamber 21a at a predetermined timing (for example, upon receipt of an instruction from controller 41 to release the first gas). Release unit 26 includes a valve that selectively places first gas chamber 21a in fluid communication with the outside space. The valve is, for example, an electromagnetic valve. In other words, release unit 26 releases the first gas contained in first gas chamber 21a to the outside space by opening the valve at a predetermined timing.

Balloon 20 includes a plurality of ducts 28 that communicatively connect the plurality of ventilation holes 22. More specifically, the plurality of ducts 28 communicatively connect the space inside coupler 25, which is located in the center of balloon 20 in a top view, with each of the plurality of ventilation holes 22. A part of fixing component 50 is disposed inside each of the plurality of ducts 28. In other words, the plurality of ducts 28 define spaces for accommodating part of fixing component 50.

Balloon 20 includes recess 29 of a size capable of housing one or more on-board devices including camera 44. The opening of recess 29 is located on the bottom end of coupler 25.

Moreover, protective nets 62 and 63 are provided at the top and bottom portions of ventilation holes 22 of balloon 20 to inhibit contact with rotor units 30 disposed inside ventilation holes 22 in the event that an object contacts the upper or lower portion of ventilation holes 22.

In this embodiment, the inner volumetric capacity of balloon 20 (i.e., the volumetric capacity of gas chamber 21) is determined such that the buoyant force of the gas filling balloon 20 is slightly more than the gross weight of aircraft 10. Thus, aircraft 10 slowly ascends even if the plurality of rotor units 30 stop mid-air.

(Rotor Units)

Next, rotor units 30 will be described.

As illustrated in FIG. 2 and FIG. 3, each rotor unit 30 includes propeller 32 and motor 33.

Motors 33 are attached to arms 52 of fixing component 50 (to be described later). Propellers 32 are attached to the output shafts of motors 33. Note that each rotor unit 30 may include two propellers 32 that coaxially rotate in opposite directions. In other words, each rotor unit 30 may include contra-rotating propellers.

One rotor unit 30 is disposed in each ventilation hole 22. Rotor units 30 are oriented such that the axes of rotation of propellers 32 are approximately vertical. The axes of rotation of propellers 32 are approximately coaxial with central axes Q of ventilation holes 22. Rotor units 30 are disposed in the central regions of ventilation holes 22 in the up-and-down direction. In other words, as illustrated in FIG. 3, rotor units 30 are disposed so as to overlap central plane M in the up-and-down direction of balloon 20. This central plane M is located in the central region of balloon 20 in the up-and-down direction, and is orthogonal to central axis P of balloon 20. The outer diameter of each rotor unit 30 is roughly equal to the inner diameter of the central region of ventilation hole 22 in the up-and-down direction.

Each rotor unit 30 is disposed such that the entire height fits within ventilation hole 22. In other words, each rotor unit 30 is laterally covered by balloon 20, across the height of rotor unit 30 in the up-and-down direction. In particular, each rotor unit 30 is laterally covered by second shock absorber 20b of balloon 20, across the height of rotor unit 30 in the up-and-down direction. Note that the "up-and-down direction" refers to the up and down directions when aircraft 10 is horizontally level and not tilted. In other words, the up-and-down direction is approximately parallel to the axis of rotation of each rotor unit 30.

Each ventilation hole 22 preferably has a height such that distances from the center in the up-and-down direct of rotor unit 30 to the top and to the bottom are each greater than or equal to the radius of rotor unit 30. With this, when rotor unit 30 receives an impact or breaks, for example, even if the axis of rotation of propeller 32 of rotor unit 30 were to rotate 90 degrees relative to aircraft 10, rotor unit 30 can be inhibited from projecting out of ventilation hole 22. Accordingly, balloon 20 can laterally cover rotor unit 30 to a degree such that rotor unit 30 is not likely to contact an object.

(On-Board Devices, Light Emitter)

As described above, aircraft 10 is provided with, as on-board devices, controller 41, battery 42, projector 43, and camera 44. Aircraft 10 is further provided with light emitter 46.

As illustrated in FIG. 3, aircraft 10 includes disc 40. Disc 40 is a disc-shaped component whose diameter is substantially equal to the bottom end of coupler 25. Disc 40 is disposed so as to cover the bottom end surface of coupler 25. Disc 40 may be made of a resin material such as polypropylene (PP), polycarbonate (PC), polybutylene terephthalate (PBT), or ABS resin, and may be made of a metal material such as aluminum, copper, or stainless steel.

Camera 44, which is used for capturing images, is attached to the bottom surface of disc 40 via gimbal 45. Camera 44 is for capturing aerial video, and is angled diagonally downward. As illustrated in FIG. 3 and FIG. 4, camera 44 protrudes beyond balloon 20 in a downward direction along a predetermined axis. Gimbal 45 is for holding camera 44 at a steady angle, even if the orientation of aircraft 10 changes.

Controller 41, battery 42, and projector 43 are disposed on top of disc 40. Controller 41 is a device that controls operation of plurality of rotor units 30. In this embodiment, controller 41 includes receiver 41a that receives an instruction signal transmitted from a radio control device functioning as a control terminal operated by an operator. Controller 41 controls rotor units 30, camera 44, projector 43, and LEDs based on the instruction signal received by receiver 41a. Controller 41 also transmits video captured by camera 44.

Note that controller 41 having the functions described above is implemented as a computer including, for example, a central processing unit (CPU), random access memory (RAM), read only memory (ROM), communications interface, and an I/O port.

Battery 42 supplies power to rotor units 30, controller 41, projector 43, and light emitter 46. Projector 43 projects video onto the inner surface of balloon 20, which is made of a semi-transparent material.

Light emitter 46 is an LED light strip including an elongated flexible printed substrate and multiple light-emitting elements (such as LEDs) aligned in the lengthwise direction of the elongated flexible printed substrate Note that aircraft 10 may include only one device among projector 43, camera 44, and light emitter 46, and, alternatively, may include all of the devices. Aircraft 10 may also include other types of devices such as a speaker and/or a display panel. In other words, aircraft 10 need only include devices for achieving basic flight, such as rotor units 30; aircraft 10 may include devices that do not essentially contribute to flight, such as projector 43 and camera 44, on an as-needed basis according to the needs of the user.

(Fixing Component)

Fixing component 50 fixes the plurality of rotor units 30 in predetermined positions in a plan view and fixes the plurality of rotor units 30 such that the axes of rotation of the plurality of rotor units 30 are substantially parallel to the up-and-down direction. More specifically, fixing component 50 includes main body 51, four arms 52, and two holding components 54.

Main body 51 is a cylindrical component having a bottom in the upper portion. Main body 51 is disposed inside the space on the inner side of coupler 25. Stated differently, main body 51 defines a space therein.

The four arms 52 are tubular components that are fixed to the side surface of main body 51, and extend in four different directions from the side surface of main body 51. Here, four different directions are directions toward each of the plurality of ventilation holes 22 from the space on the inner side of coupler 25. The four arms 52 are disposed inside ducts 28.

The four arms 52 include distal end sections 52a that fix the four rotor units 30 such that the axes of rotation of the four rotor units 30 are substantially parallel to the up-and-down direction. More specifically, the lower portion of motors 33 of rotor units 30 are fixed to distal end sections 52a.

The two holding components 54 are fixed to the lower portion of main body 51, and extend downward from main body 51. The bottom ends of the two holding components 54 hold disc 40 that supports on-board devices.

Note that main body 51 includes, where the four arms 52 are fixed thereto, through-holes for fluid communication with the inner space of main body 51. With these, the inner space of main body 51 is in fluid communication with spaces inside the four arms 52. The spaces inside the four arms 52 house electrical wiring (not illustrated) for supplying power from battery 42 to the plurality of rotor units 30. That is, the four arms 52 also function as conduit for housing electrical wiring.

Note that fixing component 50 may be supported by balloon 20 as a result of the plurality of arms 52 being held in the plurality of ducts 28 under pressure from second gas chamber 21B, and, alternatively, main body 51 may be fixed in a predetermined position on coupler 25. In other words, fixing component 50 may be fixed by any means so long as it is fixed in a predetermined position relative to balloon 20.

Disc 40 supports housing 55 that houses a weight in addition to the on-board devices. Stated differently, aircraft 10 includes housing 55. Housing 55 is a box-shaped component that defines a space that can house a metal (e.g., lead, copper, alloy) weight. Note that the weight is not limited to a metal weight; the weight may be a non-metal weight (such as sand). The weight is capable of adjusting the gross weight of aircraft 10 in predetermined units of weight (for example, 1 to 10 grams).

Since balloon 20 is made of a stretchable material, it is difficult to set the amount of gas to be filled in gas chamber 21 (stated differently, to set the volumetric area of gas chamber 21). Accordingly, it is difficult to estimate the magnitude of the buoyant force imparted by the gas without error before the gas is filled in gas chamber 21 of balloon 20.

Accordingly, by providing housing 55, after gas is filled into gas chamber 21 of balloon 20, the gross weight of aircraft 10 can be adjusted by adding or removing weights to or from housing 55. With this, as described in Embodiment 1, it is easy to adjust the gross weight of aircraft 10 such that the magnitude of the buoyant force imparted by the gas filling balloon 20 is slightly greater than the gross weight of aircraft 10. Note that the magnitude of the buoyant force imparted by the gas is set so as to always be greater than the gross weight of aircraft 10 when no weights are housed in housing 55, even when there are slight differences in volumetric area between gas chambers 21 of balloons 20.

Voltage regulators 53 are provided to the four arms 52. Voltage regulators 53 are amplifiers that adjust the voltage of the power that drives the respective motors 33 included in rotor units 30 disposed on arms 52. Voltage regulators 53 are disposed in ventilation holes 22.

(Flying Orientation of Aircraft)

As described above, in aircraft 10, on-board devices such as controller 41 and battery 42 are disposed in the lower end portion of the space inside coupler 25. In other words, the relatively heavy on-board devices are clustered in the lower portion of aircraft 10. Accordingly, the overall center of gravity of aircraft 10 is lower than the working point of the buoyant force imparted by the gas filling balloon 20. With this, even when rotor units 30 are stopped, aircraft 10 can maintain an orientation in which camera 44 is oriented downward, without rotating horizontally or flipping top over bottom, for example.

Moreover, relatively heavy on-board devices are disposed below rotor units 30. As a result, the overall center of gravity of aircraft 10 is lower than the working point of the buoyant force imparted by rotor units 30 operating. With this, even when rotor units 30 are operating, aircraft 10 can maintain an orientation in which camera 44 is oriented downward.

Aircraft 10 includes a plurality of rotor units 30. When moving aircraft 10 in a substantially horizontal direction, increasing the rotational speed of a rotor unit 30 located further in the opposite direction of travel to a speed greater than the rotational speed of a rotor unit 30 located further in the direction of travel allows aircraft 10 to increase propulsion in a horizontal direction.

Note that the "rotational speed of a rotor unit 30" means the rotational speed of propeller 32 included in the rotor unit 30 (revolutions of propeller 32 per unit time).

(Aircraft Operation Control Example)

With aircraft 10 according to this embodiment, gas release control is performed at a predetermined timing. That is to say, release unit 26 is controlled so as to release the first gas contained in first gas chamber 21a at a predetermined timing.

Next, this gas release control according to aircraft 10 will be described with reference to FIG. 7 through FIG. 9.

Figure 7:
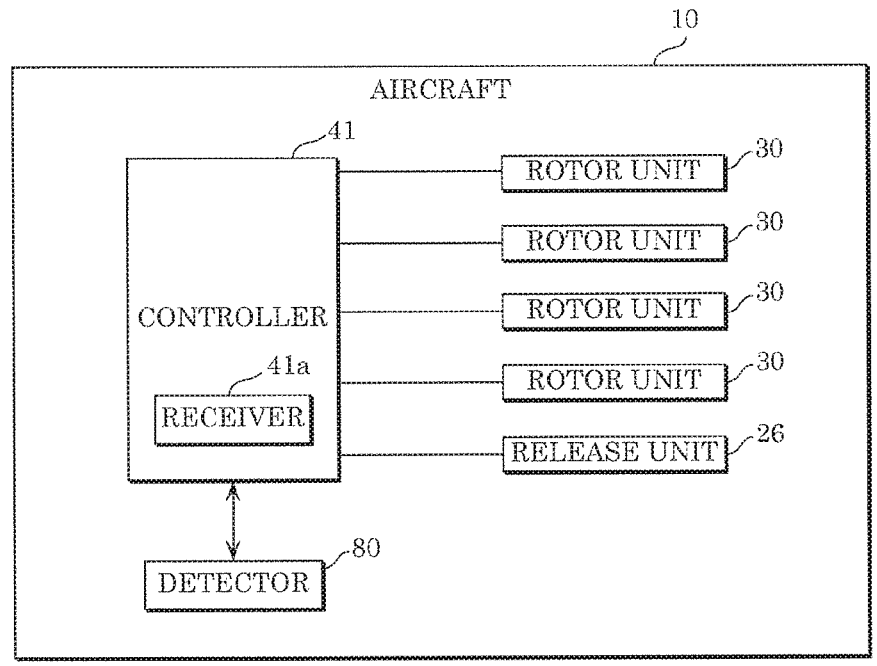
FIG. 7 is a block diagram illustrating a configuration of the aircraft according to Embodiment 1.
Figure 8A:
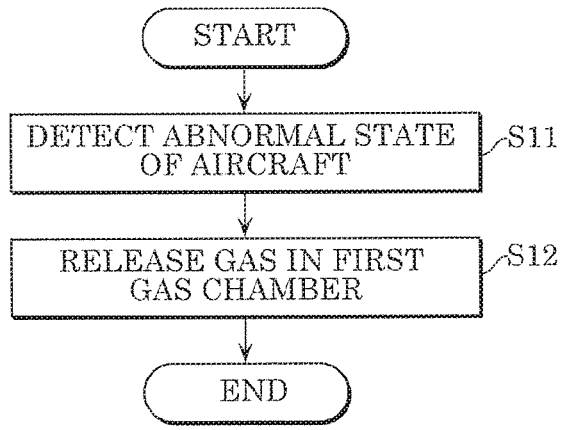
FIG. 8A is a flow chart of one example of gas release control in the aircraft according to Embodiment 1.
Figure 8B:
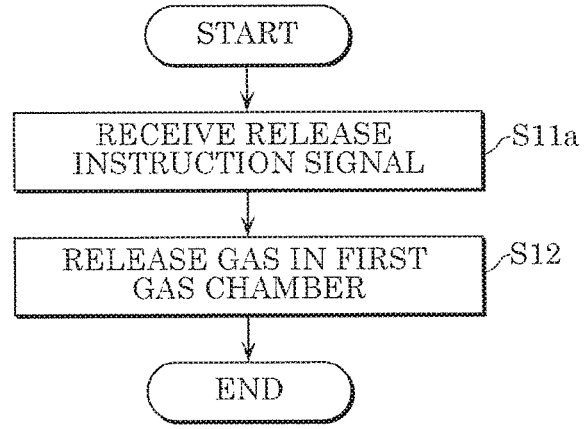
FIG. 8B is a flow chart of another example of the gas release control in the aircraft according to Embodiment 1.

FIG. 7 is a block diagram illustrating a configuration of aircraft 10 according to Embodiment 1. Note that illustration of some elements, such as battery 42 and camera 44, are omitted in FIG. 7. FIG. 8A is a flow chart of one example of the gas release control in aircraft 10 according to Embodiment 1. FIG. 8B is a flow chart of another example of the gas release control in aircraft 10 according to Embodiment 1. FIG. 9 illustrates aircraft 10 according to Embodiment 1 when gas release control is performed. Note that FIG. 9 is the same cross section as illustrated in FIG. 4.

As illustrated in FIG. 7, aircraft 10 includes a plurality (in this embodiment, four) rotor units 30, controller 41, release unit 26, and detector 80. The plurality of rotor units 30 generate thrust for flying aircraft 10.

Controller 41 controls the rotation of propellers 32 of the plurality of rotor units 30. Controller 41 includes receiver 41a that receives an instruction signal transmitted from a radio control device. Controller 41 controls the rotation of propellers 32 of the plurality of rotor units 30 in accordance with a flight instruction signal transmitted from the radio control device. Receiver 41a may also receive signals other than the above-described instruction signal.

Detector 80 detects an abnormal state of aircraft 10, and transmits an abnormal state signal indicating the result of the detection to controller 41.

More specifically, detector 80 may monitor the state of battery 42, and, for example, may detect that battery 42 has no charge or is low on charge as an abnormal state of aircraft 10. Note that battery 42 being low on charge is a state in which the charge capacity is 10% or less where a charge capacity of 100% represents a state in which battery 42 is fully charged.

Detector 80 may detect, as an abnormal state of aircraft 10, that aircraft 10 is not descending even though receiver 41a has received an instruction signal instructing aircraft 10 to descend. More specifically, detector 80 may monitor the operational state of rotor units 30, and detector 80 may detect, as an abnormal state of aircraft 10, that rotor units 30 are not being rotated so as to generate thrust that causes aircraft 10 to descend, even though receiver 41a has received an instruction signal instructing aircraft 10 to descend. Detector 80 may detect the elevation of aircraft 10, and detect, as an abnormal state of aircraft 10, that the elevation of aircraft 10 is not decreasing even though receiver 41a has received an instruction signal instructing aircraft 10 to descend.

Controller 41 transmits a release command to release unit 26 in accordance with a release instruction signal transmitted from the radio control device.

Although not illustrated in FIG. 7, note that aircraft 10 includes balloon 20 that functions as a shock absorber, as described above.

In aircraft 10 having the configuration described above, the gas release control may be implemented via, for example, the information processing and operations illustrated in FIG. 8A. In other words, detector 80 detects an abnormal state of aircraft 10 (S11). Controller 41 releases the first gas contained in first gas chamber 21a to the outside space by switching release unit 26 to an open state (S12). In other words, in the gas release control illustrated in FIG. 8A, release unit 26 releases the first gas contained in first gas chamber 21a, when, as the predetermined timing, detector 80 detects an abnormal state.

In aircraft 10 having the configuration described above, the gas release control may be implemented via, for example, the information processing and operations illustrated in FIG. 8B. In other words, receiver 41a receives a release instruction signal transmitted from the radio control device (S11a). Controller 41 releases the first gas contained in first gas chamber 21a to the outside space by switching release unit 26 to an open state (S12). Stated differently, in the gas release control illustrated in FIG. 8B, release unit 26 releases the first gas contained in first gas chamber 21a, when, as the predetermined timing, receiver 41a receives a release instruction signal indicating release of the first gas contained in first gas chamber 21a.

Figure 9:
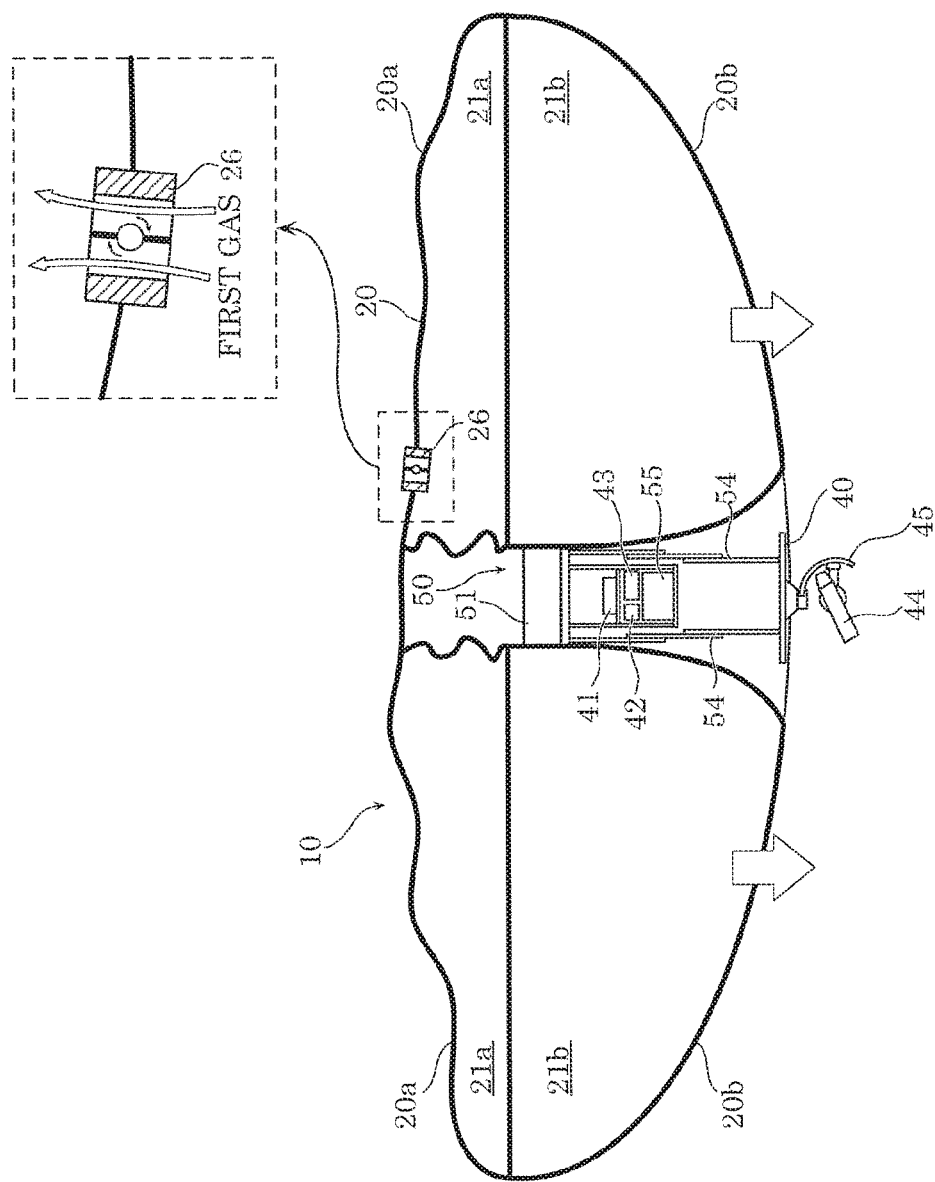
FIG. 9 illustrates the aircraft according to Embodiment 1 when the gas release control is performed.

By performing one of the gas release controls described with reference to FIG. 8A and FIG. 8B, the valve in release unit 26 places first gas chamber 21a in fluid communication with the outside space, as illustrated in FIG. 9. This releases the first gas contained in the first gas chamber 21a to the space outside first gas chamber 21a. Since the released first gas is less dense than air, the specific gravity of aircraft 10 gradually becomes heavier as the first gas is released, and the magnitude of the buoyant force imparted by the gas that filled first gas chamber 21a decreases to less than the gross weight of aircraft 10. Aircraft 10 then begins to descend.

(Advantageous Effects, Etc., of Embodiment 1)

Aircraft 10 according to this embodiment includes: a plurality of rotor units 30, each of which includes propeller 32 and motor 33 that drives propeller 32; balloon 20 including first shock absorber 20a that defines first gas chamber 21a containing a first gas less dense than air and second shock absorber 20b that is different than first shock absorber 20a; and release unit 26 that is disposed in first shock absorber 20a and releases the first gas contained in first gas chamber 21a, at a predetermined timing.

With this configuration, since the first gas that is less dense than air can be released via release unit 26 at a predetermined timing, for example, when aircraft 10 becomes uncontrollable mid-flight, aircraft 10 can be made to swiftly descend. Moreover, even if the first gas is released, since the state of second shock absorber 20b can be maintained, when aircraft 10 descends, the plurality of rotor units 30 and on-board devices in aircraft 10 such as camera 44 can be inhibited from directly contacting an object on the ground or a floating object before landing. Accordingly, even in cases in which aircraft 10 is brought down to the land by releasing the first gas, the plurality of rotor units 30, the on-board devices of aircraft 10, and/or the object can be prevented from being damaged.

Moreover, in this embodiment, second shock absorber 20b is disposed at least in the lower portion of aircraft 10. Accordingly, it is possible to maintain the state of second shock absorber 20b disposed on the lower portion of aircraft 10, even when aircraft 10 is caused to descend by releasing the first gas. As such, even while aircraft 10 is descending, the plurality of rotor units and other on-board devices of the aircraft can be effectively inhibited from directly contacting an object.

Moreover, in this embodiment, second shock absorber 20b laterally covers the plurality of rotor units 30, across a height of the plurality of rotor units 30 in the up-and-down direction. Accordingly, it is possible to maintain the state of second shock absorber 20b that laterally covers the plurality of rotor units 30, across a height of the plurality of rotor units 30 in the up-and-down direction, even when aircraft 10 is caused to descend by releasing the first gas. As such, even while aircraft 10 is descending, the plurality of rotor units 30 can be effectively inhibited from directly contacting an object.

Moreover, in this embodiment, second shock absorber 20b defines second gas chamber 21b containing a second gas that is more dense than the first gas. This makes it possible to implement second shock absorber 20b with a simple configuration.

Moreover, in this embodiment, first shock absorber 20a is disposed in the upper portion of aircraft 10. This makes it possible to efficiently release the first gas, which is less dense than air, contained in first gas chamber 21a defined by first shock absorber 20a. It also makes it possible to position the center of gravity of aircraft 10 in the lower portion of aircraft 10 and thus inhibit aircraft 10 from flipping top over bottom.

Moreover, in this embodiment, release unit 26 includes a valve that selectively places the first gas chamber in fluid communication with the outside space. In other words, release unit 26 releases the first gas contained in the first gas chamber to the outside space by opening the valve at a predetermined timing. This makes it possible to implement a simple configuration for releasing the first gas via release unit 26 at a predetermined timing.

Moreover, in this embodiment, release unit 26 is configured as an electromagnetic valve capable of freely switching between open and closed states. Accordingly, even after the gas release control has been performed and the first gas has been released, aircraft 10 can be reused if first shock absorber 20a of aircraft 10 is reinflated with the first gas.

Moreover, in this embodiment, aircraft 10 further includes receiver 41a that receives a signal. Furthermore, the predetermined timing is when receiver 41a receives a release instruction signal indicating release of the first gas contained in the first gas chamber 21a. Release unit 26 releases the first gas contained in the first gas chamber when receiver 41a receives the release instruction signal. This makes it possible to release the first gas via release unit 26 by, for example, an operator using a control terminal to transmit a release instruction signal. With this, the operator can cause aircraft 10 to swiftly descend by releasing the first gas via release unit 26 at a predetermined timing.

Moreover, in this embodiment, aircraft 10 further includes detector 80 that detects an abnormal state of the aircraft. Furthermore, the predetermined timing is when the abnormal state is detected by detector 80. Release unit 26 releases the first gas contained in first gas chamber 21a when detector 80 detects an abnormal state. This makes it possible to release the first gas via release unit 26 when aircraft 10 is in an abnormal state. This in turn makes it possible for aircraft 10 to automatically descend in the case of an abnormal state.

Moreover, in this embodiment, aircraft 10 further includes receiver 41a that receives an instruction signal transmitted from a control terminal operated by an operator. Detector 80 detects, as the abnormal state, that aircraft 10 is not descending even though receiver 41a has received an instruction signal instructing aircraft 10 to descend. This makes it possible to release the first gas via release unit 26 when aircraft 10 is in an abnormal state, namely, when aircraft 10 cannot descend. This in turn makes it possible for aircraft 10 to automatically descend in the case of an abnormal state in which aircraft 10 cannot descend even when instructed to do so by the operator.

Moreover, in this embodiment, balloon 20 has a flattened shape in the up-and-down direction.

This makes it less likely that aircraft 10 will tilt relative to the axis of symmetry (central axis P) of balloon 20 mid-flight, resulting in a more stable flight of aircraft 10.

Moreover, in this embodiment, rotor units 30 and ventilation holes 22 in which rotor units 30 are disposed are located closer to the peripheral edge of balloon 20 than central axis P of balloon 20.

Accordingly, in aircraft 10, sufficient space between the plurality of rotor units 30 can be secured. Thus, according to this embodiment, since sufficient space between the plurality of rotor units 30 can be secured, flight of aircraft 10 can be stabilized.

Moreover, in this embodiment, balloon 20 gradually decreases in height from its central region toward its peripheral edge.

With this, when viewed from a lateral side, balloon 20 has a streamline shape. Thus, according to this embodiment, it is possible to reduce the resistance of aircraft 10 to air mid-flight. Furthermore, when ventilation holes 22 are arranged at intervals of a predetermined angle around the central axis of balloon 20 extending in the up-and-down direction, ventilation holes 22 are located at relatively slim portions of balloon 20, making it possible to keep the lengths of ventilation holes 22 relatively short. The shorter the lengths of ventilation holes 22, the less the loss in air pressure is as air passes through ventilation holes 22. Thus, in this case, it is possible to secure a sufficient amount of air flow through ventilation holes 22, which makes it possible to secure sufficient propulsion by rotor units 30.

Moreover, in this embodiment, coupler 25 is provided in the central region of balloon 20 with one end connected to the upper portion of balloon 20 and the other end connected to the lower portion of balloon 20.

In other words, in the central region of balloon 20, the upper portion and lower portion of balloon 20 are connected via coupler 25. Accordingly, balloon 20 can easily assume a desired shape, such as a flattened shape. When the shape of balloon 20 is stable, ventilation holes 22 formed in balloon 20 are also stable, making it possible to achieve actual ventilation holes 22 similar to their design shape. Thus, it is possible to secure a sufficient amount of air flow through ventilation holes 22, which makes it possible to secure sufficient propulsion by rotor units 30. Moreover, stabilizing the shape of ventilation holes 22 formed in balloon 20 makes it easier to approximately match the shapes of all ventilation holes 22. This further equalizes the amount of air flowing through ventilation holes 22, which stabilizes the flight of aircraft 10.

Moreover, in this embodiment, coupler 25 has a tubular shape.

As such, the central regions of the upper and lower portions of balloon 20 (i.e., the regions surrounding central axis P of balloon 20) are connected to one another via tubular coupler 25, across the entire perimeter of the central regions. Thus, according to this embodiment, it is further easier for balloon 20 to maintain a desirable shape.

Moreover, in this embodiment, the space inside coupler 25 is in fluid communication with the space outside balloon 20.

As such, air fills the space inside coupler 25 rather than gas for exerting buoyant force, such as helium.

Moreover, in this embodiment, each ventilation hole 22 has a shape that gradually expands in cross sectional area from the central region in the up-and-down direction toward the top end portion and from the central region in the up-and-down direction toward the bottom end portion.

Giving ventilation holes 22 such a shape reduces a loss in air pressure as air flows into ventilation holes 22 and a loss in air pressure as air flows out of ventilation holes 22. As such, even when rotor units 30 generate little thrust, it is possible to secure a sufficient amount of air flow through ventilation holes 22, which makes it possible to secure sufficient propulsion by rotor units 30. Thus, since the same thrust is achieved, it is possible to reduce the amount of energy used by rotor unit 30.

Moreover, in this embodiment, balloon 20 gradually decreases in height from its central region toward its peripheral edge, and with respect to each ventilation hole 22, the height h measured near the peripheral edge of balloon 20 is less than the height H measured near the central region of balloon 20.

With this, in each ventilation hole 22 in balloon 20, air flows into ventilation hole 22 from a direction originating from the peripheral edge of balloon 20 and exits ventilation hole 22 in a direction heading toward the peripheral edge of balloon 20. As a result, air flowing into one ventilation hole 22 can be inhibited from interfering with air flowing into another ventilation hole 22, and air flowing out of one ventilation hole 22 can be inhibited from interfering with air flowing out of another ventilation hole 22. Thus, according to this embodiment, disruption of airflow due to interference of air flowing into and out of ventilation holes 22 can be inhibited, which stabilizes flight of aircraft 10.

Moreover, in this embodiment, rotor units 30 are disposed in the central regions in the up-and-down direction of ventilation holes 22. In other words, rotor units 30 are disposed so as to overlap a central plane in the up-and-down direction of balloon 20.

As such, air flowing from the top of ventilation hole 22 toward rotor unit 30 and air flowing from rotor unit 30 toward the bottom of ventilation hole 22 can be stabilized, which stabilizes flight of aircraft 10.

Moreover, in this embodiment, ventilation holes 22 are arranged at intervals of a predetermined angle around central axis P of balloon 20 extending in the up-and-down direction.

Since the plurality of rotor units 30 are therefore disposed at intervals of a predetermined angle around central axis P of balloon 20 and blow air downward, flight of aircraft 10 can be stabilized.

Moreover, in this embodiment, balloon 20 has rotational symmetry about a line extending in the up-and-down direction.

As such, the working point of the buoyant force imparted by the gas filling balloon 20 can be located on the axis of symmetry (i.e., central axis P) of balloon 20. As such, aircraft 10 can be inhibited from tilting mid-flight (i.e., tilt relative to the up-and-down (vertical) direction of central axis P of balloon 20), which stabilizes flight of aircraft 10.

Moreover, in this embodiment, in a top view, the peripheral edge of balloon 20 includes reference curve sections 23 and small curvature radius sections 24 having a smaller radius of curvature than reference curve sections 23. Reference curve sections 23 and small curvature radius sections 24 are alternately arranged around the peripheral edge. There are the same number of reference curve sections 23 as there are ventilation holes 22 and the same number of small curvature radius sections 24 as there are ventilation holes 22. Each small curvature radius section 24 is disposed adjacent to a different one of ventilation holes 22, in a more peripheral position than the ventilation hole 22 it is disposed adjacent to.

Here, tension working in sections of the peripheral edge of balloon 20 in a top view near ventilation holes 22 is lower than tension working in sections of the peripheral edge of balloon 20 in a top view further away from ventilation holes 22. This is because tension is working on portions of balloon 20 that form the walls of ventilation holes 22. When tension working on balloon 20 is regionally low, wrinkles easily form where working tension is low.

In light of this, in this embodiment, the radius of curvature of sections of the peripheral edge of balloon 20 in a top view near ventilation holes 22 is less than the radius of curvature of sections of the peripheral edge of balloon 20 in a top view further from ventilation holes 22. As such, the difference between tension working in sections of the peripheral edge of balloon 20 in a top view near ventilation holes 22 and tension working in sections of the peripheral edge of balloon 20 in a top view further away from ventilation holes 22 can be reduced. Thus, according to this embodiment, wrinkles can be kept from forming in balloon 20, and the aesthetics of balloon 20 can be maintained.

Moreover, in this embodiment, on-board devices are housed in the space inside coupler 25. The housed on-board devices include at least controller 41 that controls rotor units 30 and battery 42 that supplies power to rotor units 30.

The space inside coupler 25 is in fluid communication with the space outside balloon 20. As such, maintenance such as changing battery 42 disposed in the space inside coupler 25 can be done without releasing the gas for providing buoyancy, such as helium, from balloon 20.

Moreover, in this embodiment, on-board devices are disposed at the bottom end portion of the space inside coupler 25.

As such, the center of gravity of aircraft 10 can be lowered, thereby stabilizing flight of aircraft 10.

Moreover, in this embodiment, coupler 25 is transparent, and light emitter 46 is housed in the space inside coupler 25.

In this embodiment, light emitted by light emitter 46 passes through the transparent coupler 25. As such, if the outer layer of balloon 20 is made of a semi-transparent material, for example, light emitted by light emitter 46 will strike the inner surface of balloon 20, whereby the color of the entire balloon 20 can be changed to the color of light emitted by light emitter 46. Thus, according to this embodiment, the color of balloon 20 can be changed mid-flight to easily achieve a dramatic effect, for example.

Variations of Embodiment 1

Variation 1

Figure 10:
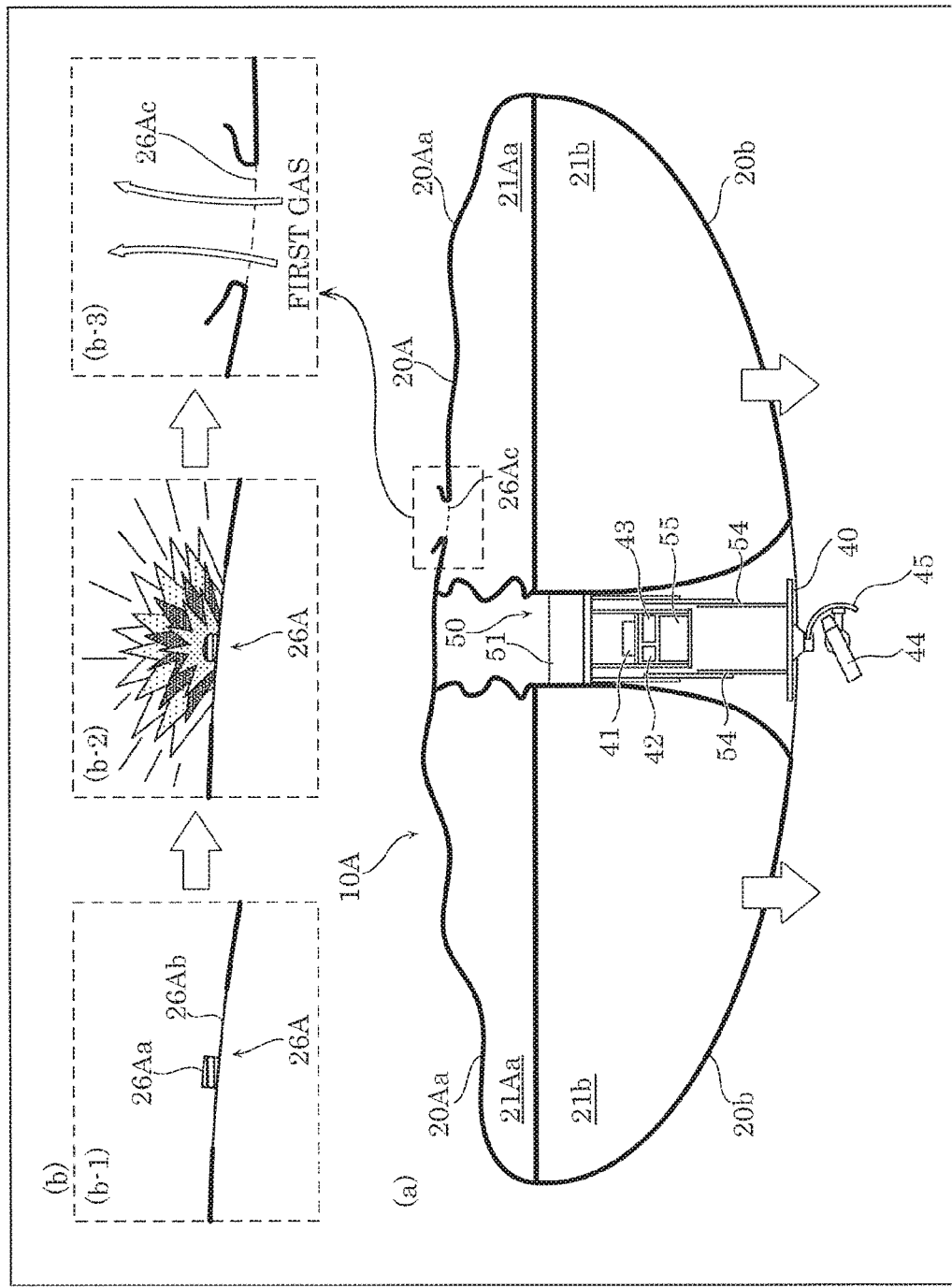
FIG. 10 illustrates an aircraft according to Variation 1 of Embodiment 1 when the gas release control is performed.

In aircraft 10 according to Embodiment 1, release unit 26 is implemented as a valve, but release unit 26 is not limited to this example. For example, as illustrated in FIG. 10, aircraft 10A includes balloon 20A having, instead of release unit 26, hole opener 26Aa that opens a hole in a predetermined region of first shock absorber 20Aa. FIG. 10 illustrates aircraft 10A according to Variation 1 of Embodiment 1 when gas release control is performed. In FIG. 10, (a) illustrates the whole aircraft 10A after gas release control has been performed, and (b) illustrates enlarged views of release unit 26A of aircraft 10 before and after gas release control is performed. Note that FIG. 10 is the same cross section as illustrated in FIG. 4.

As illustrated in (b-1) in FIG. 10, in a state before gas release control has been performed, release unit 26A is disposed on the upper portion of first shock absorber 20Aa in aircraft 10A. Release unit 26A includes, for example, hole opener 26Aa including gunpowder capable of creating a small explosion. Hole opener 26Aa creates a small explosion upon receiving a release command from controller 41 at a predetermined timing ((b-2) in FIG. 10) that opens hole 26Ac in first shock absorber 20Aa, which places first gas chamber 21Aa in fluid communication with the outside space ((b-3) in FIG. 10). This releases the first gas contained in the first gas chamber 21Aa to the space outside first gas chamber 21Aa. Since the released first gas is less dense than air, the specific gravity of aircraft 10A gradually becomes heavier as the first gas is released, and the magnitude of the buoyant force imparted by the gas that filled first gas chamber 21Aa decreases to less than the gross weight of aircraft 10A. Aircraft 10A then begins to descend.

In this way, with aircraft 10A according to Variation 1 of Embodiment 1, release unit 26A is configured to open hole 26Ac in first shock absorber 20Aa, which places first gas chamber 21Aa in fluid communication with the outside space. Release unit 26A releases the first gas contained in first gas chamber 21Aa to the outside space at a predetermined timing by opening hole 26Ac. This makes it possible to implement a simple configuration for releasing the first gas via release unit 26A at a predetermined timing.

Note that, as illustrated in (b-1) in FIG. 10, region 26Ab in which hole 26Ac is opened in first shock absorber 20Aa is preferably more fragile than other regions of first shock absorber 20Aa. More specifically, region 26Ab in which hole 26Ac is opened may be made to be fragile by being thinner than other regions of first shock absorber 20Aa or by being made of a more fragile material than the vinyl chloride material used to make first shock absorber 20Aa (e.g., latex). This makes it easy to open hole 26Ac in the region of first shock absorber 20Aa where hole 26Ac is to be formed.

Moreover, the hole opener is not limited to opening the hole via a small explosion. The hole opener may open a hole in region 26Ab in which hole 26Ac is to be formed using a needle or sharp blade. In other words, the hole opener is not limited to the above example, and may have any configuration that can open a hole in first shock absorber 20Aa.

Variation 2

Figure 11:
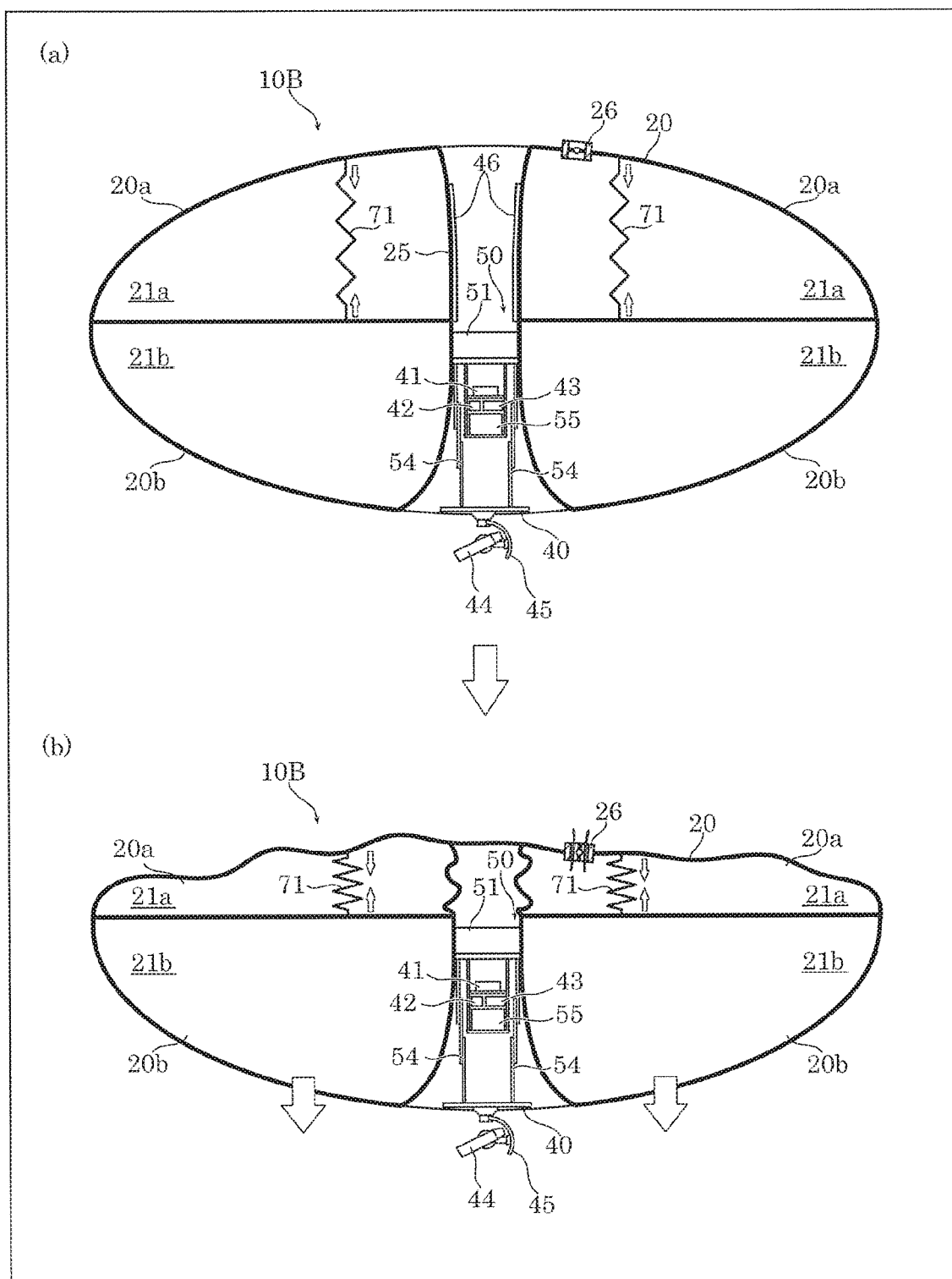
FIG. 11 illustrates an aircraft according to Variation 2 of Embodiment 1 when the gas release control is performed.

Moreover, aircraft 10B may be implemented by adding, to aircraft 10 according to Embodiment 1, compression components 71 for speeding up the releasing of the first gas when the gas release control is performed. FIG. 11 illustrates aircraft 10B according to Variation 2 of Embodiment 1 when gas release control is performed. Note that (a) in FIG. 11 illustrates aircraft 10B before the gas release control is performed, and corresponds to the cross section as illustrated in FIG. 4. Note that (b) in FIG. 11 illustrates the overall state of aircraft 10B after the gas release control has been performed.

As illustrated in FIG. 11, inside first shock absorber 20a of aircraft 10B, compression components 71 are implemented as compression springs, which are disposed in a state in which they are expanded beyond their resting state. The respective ends of each compression component 71 are connected to the upper portion and lower portion of first shock absorber 20a. Stated differently, compression components 71 are connected to the upper portion and lower portion of first shock absorber 20a in a state in which a compressive force is exerted that pulls the upper portion and lower portion of first shock absorber 20a toward one another. In this way, even though compression components 71 exert a compressive force that pulls the upper portion and the lower portion of first shock absorber 20a toward one another, since first gas chamber 21a of first shock absorber 20a is filled with the first gas, the compressive force and the pressure of the first gas are in equilibrium. Thus, first shock absorber 20a can maintain its cross-sectional elliptical shape without being deformed by compression components 71.

Here, as illustrated in (b) in FIG. 11, since the first gas is released via release unit 26 when the gas release control is performed, the pressure of first gas and the compressive force from compression components 71 fall out of equilibrium. Accordingly, compression components 71 exert a compressive force that pulls the upper portion and lower portion of first shock absorber 20a toward one another. As a result, compression components 71 causes first gas chamber 21a to contract. This releases the first gas contained in the first gas chamber 21a more quickly. Thus, by performing the gas release control, aircraft 10B can be caused to descend more quickly.

Variation 3

In aircraft 10 according to Embodiment 1, first shock absorber 20a, 20Aa is made of the same vinyl chloride as second shock absorber 20b, but may be made of a material that is more fragile than vinyl chloride (for example, latex).

Variation 4

In aircraft 10 according to Embodiment 1, second shock absorber 20b is the portion of balloon 20 that defines second gas chamber 21b, but second shock absorber 20b is not limited to this example. For example, second shock absorber 20b may be made of a solid material, such as a sponge material or rubber material. In other words, second shock absorber 20b may be made of any material so long as the material can absorb the impact when colliding with an object.

Variation 5

In aircraft 10 according to Embodiment 1, ventilation holes 22 in which the plurality of rotor units 30 are disposed each extend across first shock absorber 20a and second shock absorber 20b, but ventilation holes 22 are not limited to this example. For example, the ventilation holes may be formed exclusively in the second shock absorber. Note that when the ventilation holes are formed exclusively in the second shock absorber, the first shock absorber may be small in size and disposed more centrally than the ventilation holes. Moreover, a plurality of the first shock absorbers may be disposed in regions so as to avoid the upper and lower areas of the ventilation holes.

Variation 6

In Embodiment 1, the release instruction signal is received by receiver 41a included in controller 41, but this is merely one example. The release instruction signal may be received by a receiver included in a different controller independent from controller 41. In such cases, the different controller is preferably supplied with power from a different battery than battery 42. In other words, the different receiver may be included in a controller in an auxiliary control system different from the control system including controller 41. Accordingly, even when controller 41, battery 42, etc., in the main control system malfunction, the operator can still operate a control terminal to control release unit 26. With this, even when the main control system malfunctions and can no longer perform control, since the auxiliary control system can be used to control release unit 26, the first gas contained in first shock absorber 20a can be released to cause aircraft 10 to quickly descend.

Embodiment 2

Next, Embodiment 2 will be described.

Figure 12:
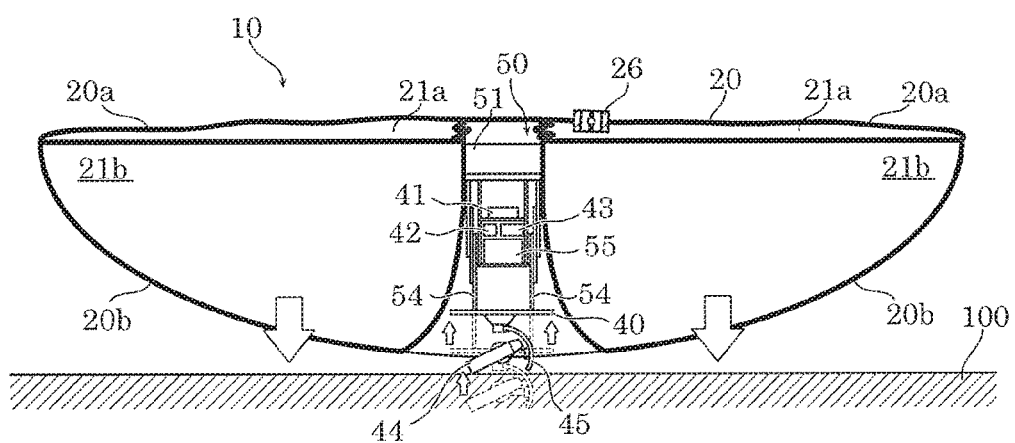
FIG. 12 illustrates the aircraft according to Embodiment 1 having fallen to the ground as a result of the gas release control being performed.

Embodiment 2 is implemented to solve problems that arise when aircraft 10 falls from the air. One example of aircraft 10 falling from the air is illustrated in FIG. 12, in which aircraft 10 falls to ground 100 when the gas release control described in Embodiment 1 is performed. Another example of a cause of the aircraft falling from the air is when the gross weight of the aircraft is slightly greater than its buoyant force and, for example, the aircraft encounters an unexpected flight situation, such as one or more of rotor units 30 becoming uncontrollable. Note that FIG. 12 illustrates aircraft 10 according to Embodiment 1 having fallen to ground 100 as a result of the gas release control being performed.

(Configuration of Holding Components)

Since aircraft 10 according to Embodiment 2 is the same as aircraft 10 according to Embodiment 1, detailed description thereof will be omitted. Here, the two holding components 54 included in fixing component 50 whose functions were not described in detail in Embodiment 1 will be described with reference to FIG. 13.

Figure 13:
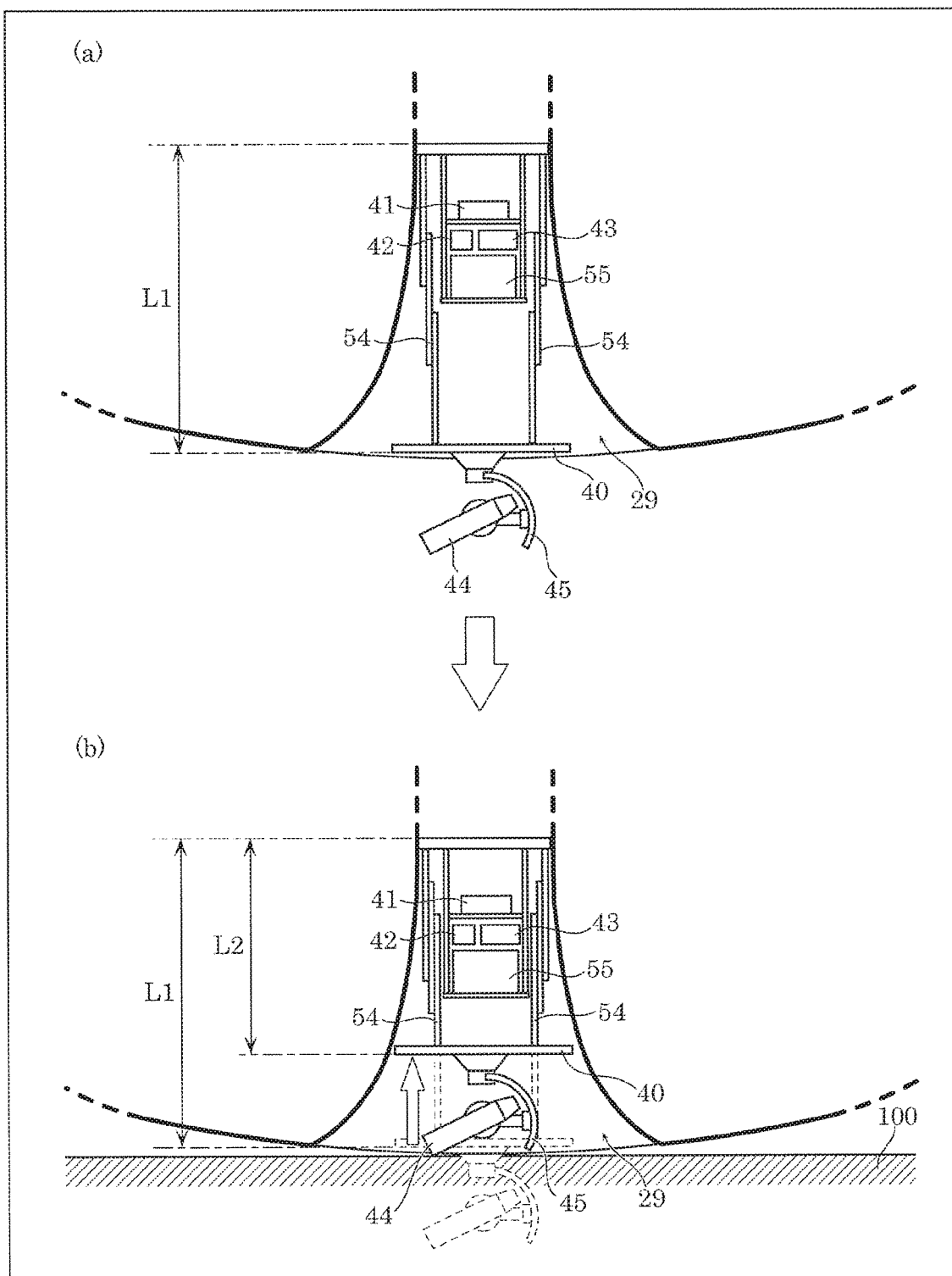
FIG. 13 is an enlarged view of holding components and camera in the aircraft.

FIG. 13 is an enlarged view of holding components 54 and camera 44 in aircraft 10. In FIG. 13, (a) illustrates an enlarged view of holding components 54 and camera 44 when aircraft 10 is flying. In FIG. 13, (b) illustrates an enlarged view of holding components 54 and camera 44 when aircraft 10 has fallen to ground 100.

As illustrated in (a) in FIG. 13, holding components 54 hold disc 40, which supports camera 44, in a state in which camera 44 is protruding downward. For example, when aircraft 10 is flying, holding components 54 hold disc 40, which supports camera 44, at the bottom end of recess 29, and each have an overall length of first length L1. In other words, when aircraft 10 is flying, holding components 54 hold camera 44 so as to protrude downward, below balloon 20, thereby inhibiting balloon 20 from entering the frame of the video being captured by camera 44 and making it possible to capture video having a wide field of view.

As illustrated in (b) in FIG. 13, the overall length of each holding component 54 can be shortened along a predetermined axis extending up and down, i.e., the axis along which camera 44 protrudes from balloon 20. More specifically, the overall length of each holding component 54 can be shortened to a position at which camera 44 is housed in recess 29. In other words, when disc 40 is in a position at which camera 44 is housed in recess 29, the overall length of each holding component 54 is second length L2. Holding components 54 are flexible, which allows them to contract and expand up and down. When camera 44 is pushed up from below, along the predetermined axis, holding components 54 contract.

For example, as illustrated in FIG. 13, holding components 54 may be implemented as sliding rails each having three sections and capable of sliding up and down. The three sections in each holding component 54 are capable sliding along one another, and may have ball bearings to help them slide smoothly. Note that each holding component 54 may be a sliding rail having two or four or more sections.

Since holding components 54 are capable of contracting, even when camera 44 contacts ground 100, camera 44 can be housed in recess 29 of balloon 20, reducing the impact imparted on camera 44.

Advantageous Effects, Etc., of Embodiment 2

Aircraft 10 according to this embodiment includes: a plurality of rotor units 30 each of which includes propeller 32 and motor 33 that drives propeller 32; balloon 20 functioning as a shock absorber that laterally covers the plurality of rotor units 30, across a height of the plurality of rotor units 30 in an up-and-down direction; camera 44 disposed protruding downward, along a predetermined axis, beyond balloon 20; and holding components 54 that hold camera 44 and whose overall lengths can be shortened in the up-and-down direction.

Accordingly, even when aircraft 10 accidentally contacts an object, camera 44, which is an on-board device, can recede into balloon 20. This reduces the impact imparted on camera 44 of aircraft 10 and/or the object, and reduces damage to camera 44 and/or the object.

Moreover, in this embodiment, balloon 20 includes recess 29 of a size capable of housing camera 44, and the overall length of each holding component 54 can be shortened to a position at which camera 44 is housed in recess 29. Accordingly, even when aircraft 10 accidentally contacts an object, camera 44, which is an on-board device, can recede into recess 29 of balloon 20. In other words, even if aircraft 10 contacts an object, if holding components 54 contract to the position at which camera 44 is housed in recess 29, balloon 20 will contact the object in areas around recess 29, so the impact imparted to camera 44 and/or the object can be effectively reduced.

Moreover, in this embodiment, holding components 54 are flexible, and when the camera is pushed up from below, contract. Accordingly, even when camera 44 of aircraft 10 accidentally contacts an object, camera 44 is pushed thereby causing holding components 54 to contract and camera 44 to recede so as to be housed in recess 29 of balloon 20. In other words, even if camera 44 of aircraft 10 contacts an object, camera 44 will resultantly be housed in recess 29 of balloon 20, and the next thing that will contact the object is the bottom end of recess 29 of balloon 20. This effectively reduces the impact imparted to camera 44 and/or the object.

Variations of Embodiment 2

Variation 1

Figure 14:
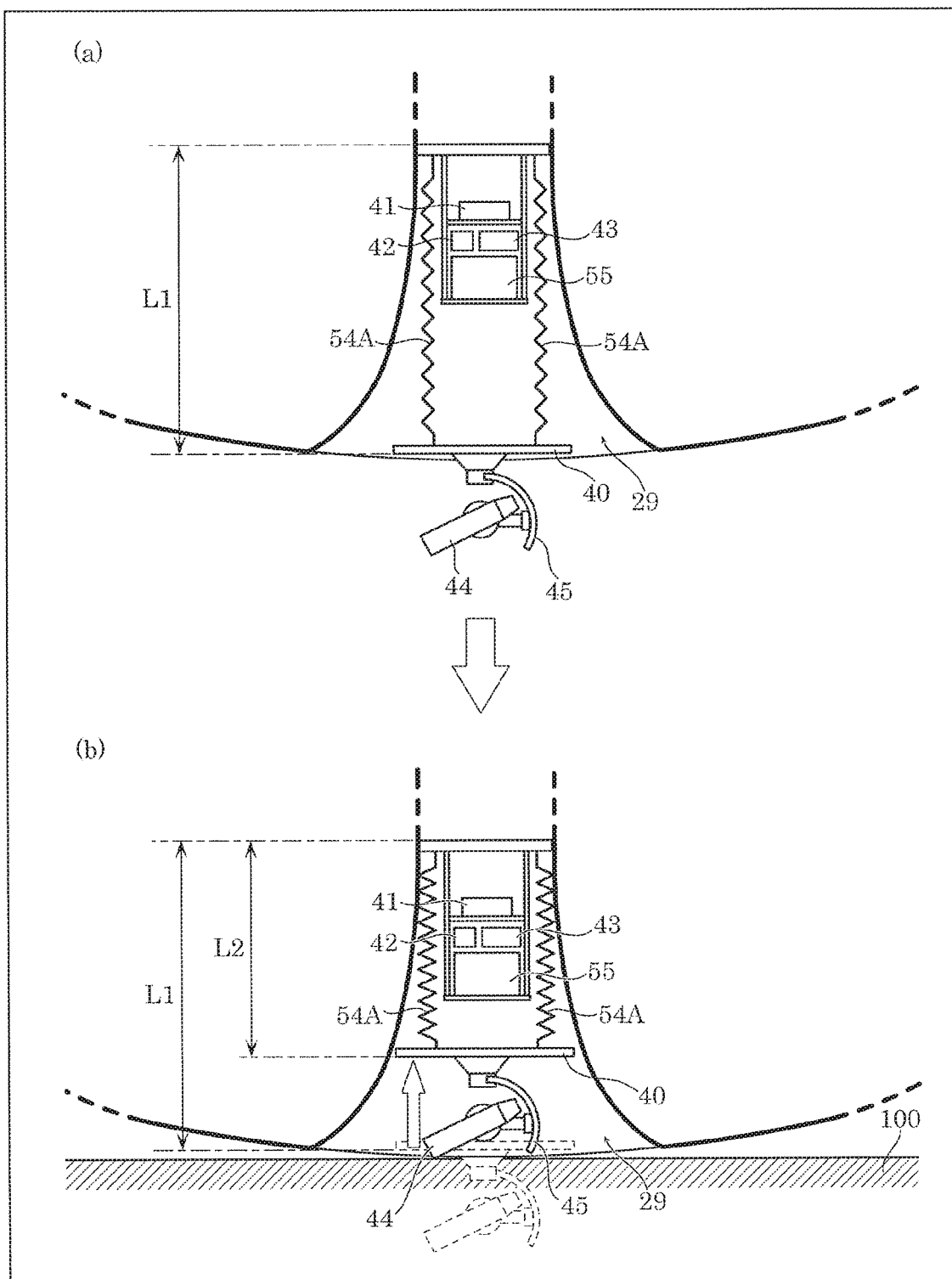
FIG. 14 is an enlarged view of holding components and camera in an aircraft according to Variation 1 of Embodiment 2.

In Embodiment 2, holding components 54 are implemented as sliding rails, but holding components 54 are not limited to this example. For example, as illustrated in FIG. 14, holding components 54A implemented as bellows may be used. FIG. 14 is an enlarged view of holding components 54A and camera 44 in the aircraft according to Variation 1 of Embodiment 2.

Moreover, the holding components are not limited to sliding rails or bellows; a configuration in which one of two sleeves having different diameters is inserted into the other may be used, and a configuration using three or more metal wires, strings, or cords may be used.

Variation 2

In Embodiment 2, holding components 54 passively contract when camera 44 is pushed up from below, but holding components 54 are not limited to this example. For example, holding components 54 may be configured to detect when camera 44 is about to contact an object and actively contract.

Figure 15:
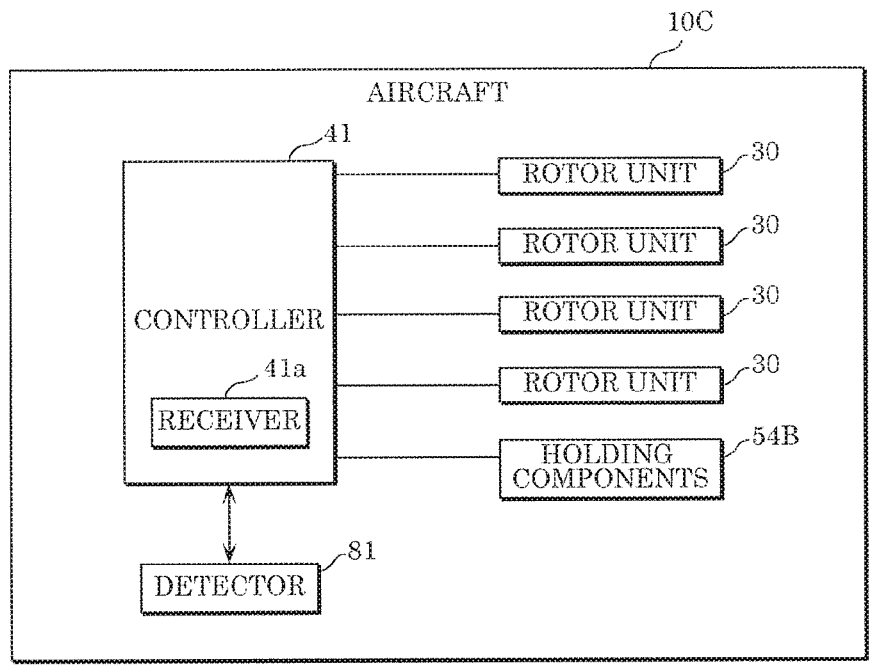
FIG. 15 is a block diagram illustrating a configuration of an aircraft according to Variation 2 of Embodiment 2.
Figure 16A:
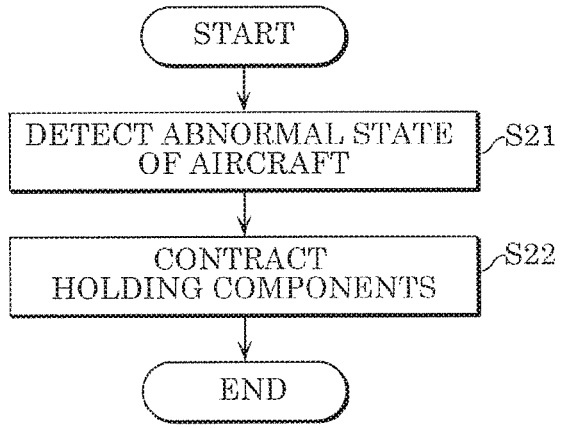
FIG. 16A is a flow chart of one example of contraction control for the holding components in the aircraft according to Variation 2 of Embodiment 2.
Figure 16B:
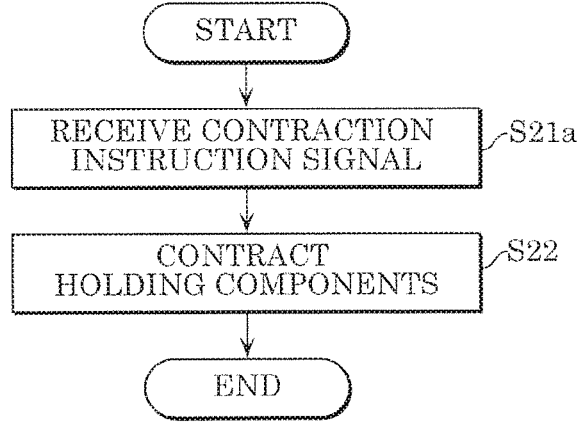
FIG. 16B is a flow chart of one example of the contraction control for the holding components in the aircraft according to Variation 2 of Embodiment 2.
Figure 17:
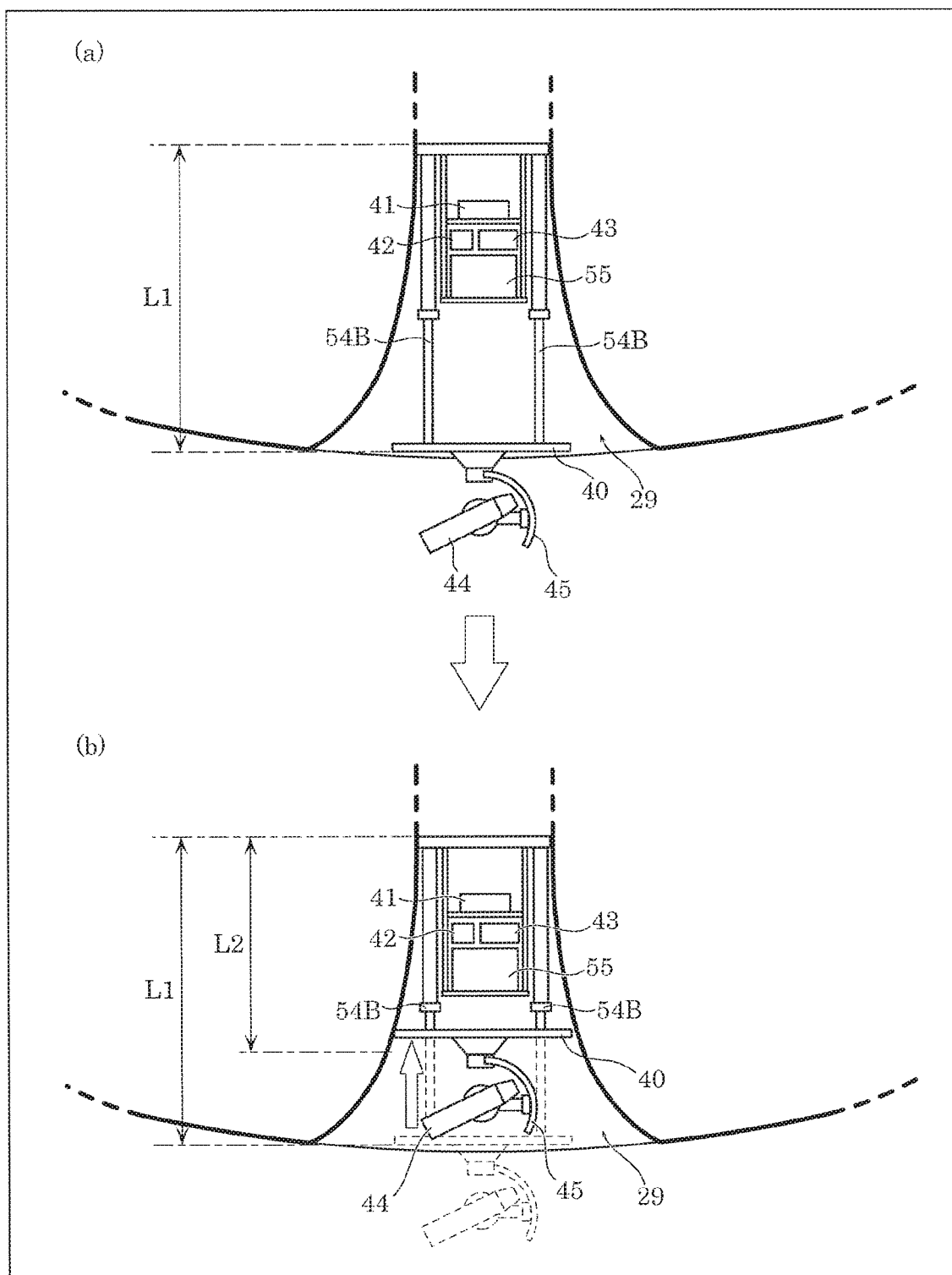
FIG. 17 is an enlarged view of the holding components and camera in the aircraft.

FIG. 15 is a block diagram illustrating a configuration of aircraft 10C according to Variation 2 of Embodiment 2. FIG. 16A is a flow chart of one example of contraction control for holding components 54B in aircraft 10C according to Variation 2 of Embodiment 2. FIG. 16B is a flow chart of one example of contraction control for holding components 54B in aircraft 10C according to Variation 2 of Embodiment 2. FIG. 17 is an enlarged view of holding components 54B and camera 44 in aircraft 10C.

Aircraft 10C according to Variation 2 of Embodiment 2 differs from aircraft 10 according to Embodiment 1 in that release unit 26 is omitted and replaced with holding components 54B driven by controller 41, as illustrated in FIG. 15. Moreover, what is detected by detector 81 in aircraft 10C according to Variation 2 of Embodiment 2 differs from what is detected by the detector in aircraft 10 according to Embodiment 1. The remaining components in aircraft 10C according to Variation 2 of Embodiment 2 are the same as in aircraft 10 according to Embodiment 1. Accordingly, the following description will focus on the points of difference with aircraft 10 according to Embodiment 1; description of other components is omitted.

Holding components 54B are implemented as, for example, electric cylinders whose overall lengths are adjusted via a motor. Note that holding components 54B are not limited to electric cylinders, and may be implemented as, for example, hydraulic or pneumatic cylinders. The overall length of each holding component 54B is shortened by holding components 54B being driven by controller 41 at a predetermined timing.

Detector 81 detects the state of aircraft 10C, and transmits a predetermined signal indicating a result of the detection to controller 41. More specifically, detector 81 is implemented as a distance measuring unit configured to measure a distance to an object below aircraft 10C. Detector 81 may be implemented as, for example, a ranging device capable of detecting the presence of an object within a predetermined distance by reflecting laser light or sound waves off an object. For example, detector 81 may analyze image data captured by camera 44 included in aircraft 10C to detect an object present in the surrounding area of aircraft 10C.

In this way, by using detector 81 which uses laser light, sound waves, or image data, aircraft 10C can recognize an object relatively far away (for example, tens of meters) from aircraft 10C. Detector 81 is triggered to transmit the predetermined signal indicating the result of the detection to controller 41 when the object comes within a predetermined distance (for example, a few meters) from aircraft 10C.

Note that when detector 81 uses image data captured by camera 44, camera 44 may function as detector 81.

In aircraft 10C having the configuration described above, the contraction control may be implemented via, for example, the information processing and operations illustrated in FIG. 16A. In other words, detector 81 detects the state of aircraft 10C (S21). Controller 41 shortens the overall length of each holding component 54B in accordance with the detection result from detector 81 (S22). In other words, with the contraction control illustrated in FIG. 16A, controller 41 shortens the overall length of each holding component 54B when, as the predetermined timing, the distance to the object detected by detector 81 is less than a predetermined distance.

In aircraft 10C having the configuration described above, the contraction control may be implemented via, for example, the information processing and operations illustrated in FIG. 16B. In other words, receiver 41a receives a contraction instruction signal transmitted from the radio control device (S21a). Controller 41 shortens the overall length of each holding component 54B when, as the predetermined timing, receiver 41a receives the contraction instruction signal (S22). In other words, with the contraction control illustrated in FIG. 16B, controller 41 shortens the overall length of each holding component 54B when, as the predetermined timing, receiver 41a receives a contraction instruction signal instructing that the overall length of each holding component 54B be shortened.

As a result of the contraction control described in FIG. 16A and FIG. 16B, the overall length of each holding component 54B shortens from first length L1 to second length L2, as illustrated in FIG. 17. This makes it possible to house camera 44 in recess 29 of balloon 20 at a predetermined timing.

In this way, for example, controller 41 can automatically shorten the overall length of each holding component 54B when, as the predetermined timing, the distance to an object below aircraft 10C is less than a predetermined distance. With this, when aircraft 10C contacts an object, an on-board device, such as camera 44, can be housed within balloon 20 so as not to protrude beyond balloon 20. This makes it possible to inhibit an on-board device from contacting an object and prevent damage to the on-board device and/or the object.

Moreover, for example, controller 41 can shorten the overall length of holding components 54B as a result of the operator using the radio control device to transmit a contraction instruction signal. With this, as a result of the operator shortening the overall length of holding components 54B at a predetermined timing, an on-board device can be housed within balloon 20 so as not to protrude beyond balloon 20, even when aircraft 10C is flying. This makes it possible to inhibit an on-board device from contacting an object and prevent damage to the on-board device and/or the object.

Figure 18:
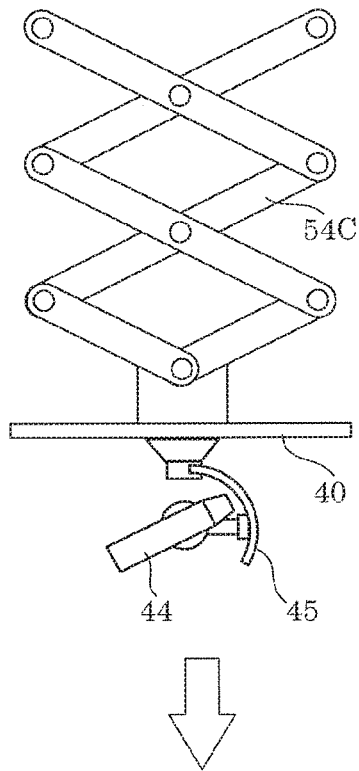
FIG. 18 is an enlarged view of the holding components and camera in the aircraft.
Figure 18:
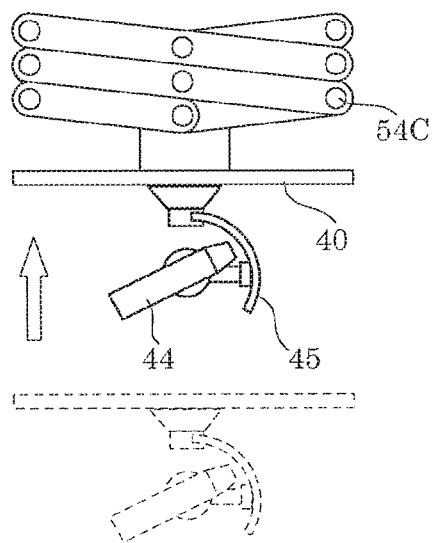

In FIG. 17, each holding components 54B is implemented as a cylinder device such as an electric cylinder, but holding components 54B are not limited to cylinder devices. For example, as illustrated in FIG. 18, the holding components may be implemented as holding component 54C having a structure including a plurality of links each supportably rotatable at three axes of rotation. Even with the structure of holding component 54C, the overall length of holding component 54C can be shortened.

Moreover, the overall lengths of holding components 54B, 54C are shortened at a predetermined timing. Thereafter, holding components 54B, 54C may be extended at a different timing. In other words, holding components 54B, 54C are variable-length components capable of contracting and extending. For example, receiver 41a receives a length-change instruction signal (contraction instruction signal or extension instruction signal) transmitted from the radio control device. Controller 41 changes (extends or shortens) the overall length of holding components 54B, 54C when, as the predetermined timing, receiver 41a receives the length-change instruction signal.

Variation 3

In Embodiment 2 described above, aircraft 10 has, but it not limited to, the same configuration as described in Embodiment 1; for example, release unit 26 may be omitted from aircraft 10. Moreover, balloon 20 is exemplified as gas chamber 21 being divided into first shock absorber 20a and second shock absorber 20b, but balloon 20 may have a single gas chamber. In such cases, balloon 20 preferably contains the same gas as the first gas. Moreover, in Embodiment 1, at least the first shock absorber is required to be a balloon, but this example is not limiting; so long as the shock absorber laterally covers the plurality of rotor units 30, across the height of the plurality of rotor units 30 in the up-and-down direction, the shock absorber may be made of any material. In other words, in Embodiment 2, the shock absorber may be made of a solid material such as a sponge material or rubber material.

Embodiment 3

Next, Embodiment 3 will be described.

Embodiment 3 is implemented mainly to solve problems that arise when the aircraft falls from the air, similar to Embodiment 2. As cases in which the aircraft falls from the air are described in Embodiment 2, repeated description thereof will be omitted.

Figure 19:
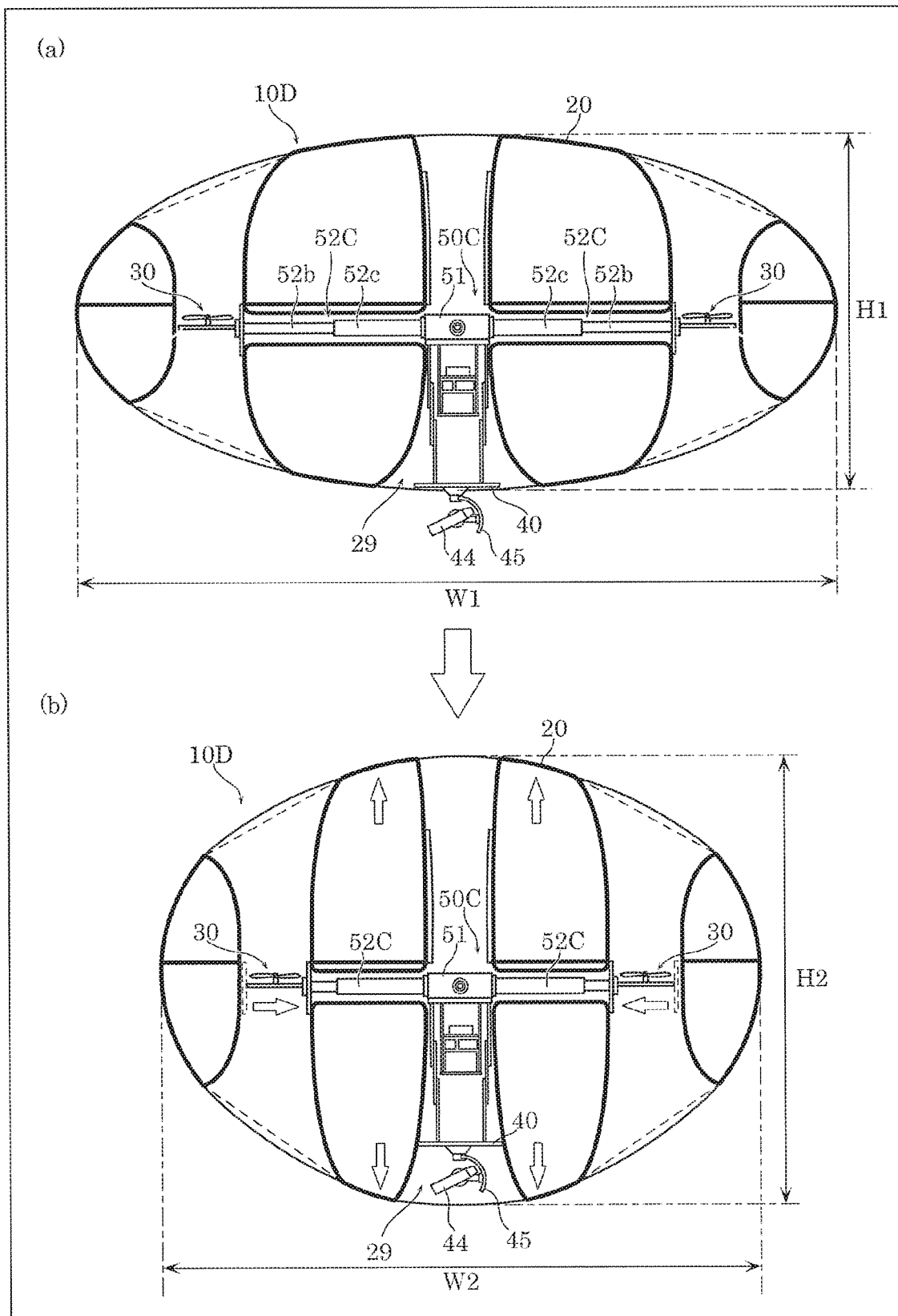
FIG. 19 illustrates an aircraft according to Embodiment 3 when the shape-change control is performed.

FIG. 19 illustrates aircraft 10D according to Embodiment 3 when shape-change control is performed. Note that (a) in FIG. 19 illustrates aircraft 10D before the shape-change control is performed, and corresponds to the cross section as illustrated in FIG. 3. Note that (b) in FIG. 19 illustrates the overall state of aircraft 10D after the shape-change control has been performed.

Aircraft 10D according to Embodiment 3 differs from the aircraft according to Embodiment 1 in regard to the configuration of fixing component 50C, as illustrated in FIG. 19. As such, fixing component 50C will be described.

Fixing component 50C differs from fixing component 50 in aircraft 10 according to Embodiment 1 in that arms 52C are capable of contracting.

The plurality of arms 52C each include movable part 52b including distal end section 52a, and fixed part 52c. The plurality of arms 52C each contract by housing movable part 52b inside fixed part 52c. The plurality of arms 52C are configured as, for example electric cylinders. In each arm 52C, the portion of movable part 52b that is exposed in ventilation hole 22 is fixed to ventilation hole 22. Accordingly, as a result of each of the plurality of arms 52C contracting, the external shape of balloon 20 changes, as illustrated in (b) in FIG. 19. More specifically, the shape of balloon 20 having a height H1 and a width W1 before the plurality of arms 52C are contracted changes to a shape in which the width of balloon 20 narrows, to a width W2 smaller than width W1, when the plurality of arms 52C contract. The pressure inside balloon 20 causes the height of balloon 20 to increase by the amount by which the width of balloon 20 narrows, to a height of H2 greater than height H1.

This causes the bottom end of recess 29 of balloon 20 to lower in position, whereby an on-board device, such as camera 44, is housed inside recess 29.

In other words, the plurality of arms 52C of fixing component 50C are driven by drive unit 90 (to be referenced later) and change the external shape of balloon 20 functioning as the shock absorber at a predetermined timing. More specifically, the plurality of arms 52C change the external shape of balloon 20 so that part or all of an on-board device, such as camera 44, does not protrude beyond balloon 20. The plurality of arms 52C are connected to ventilation holes 22 in four locations inside balloon 20, and change the external shape of balloon 20 by pulling ventilation holes 22 closer together.

With this, the plurality of arms 52C cause recess 29, which defines at least part of the external shape of balloon 20, to protrude downward. Even more specifically, the plurality of arms 52C cause at least part of balloon 20 in the surrounding area of camera 44 to protrude beyond camera 44.

Note that all four of the plurality of arms 52C contract, but by causing only the two arms 52C that contract in opposite directions to contract, two locations inside balloon 20 can be brought closer to each other. Accordingly, the configuration is not limited to four arms being capable of contracting; two arms that contract in opposite directions may be capable of contracting.

(Aircraft Operation Control Example)

With aircraft 10D according to this embodiment, shape-change control is performed at a predetermined timing to change the external shape of balloon 20.

Next, this shape-change control according to aircraft 10D will be described with reference to FIG. 19 through FIG. 21B.

Figure 20:
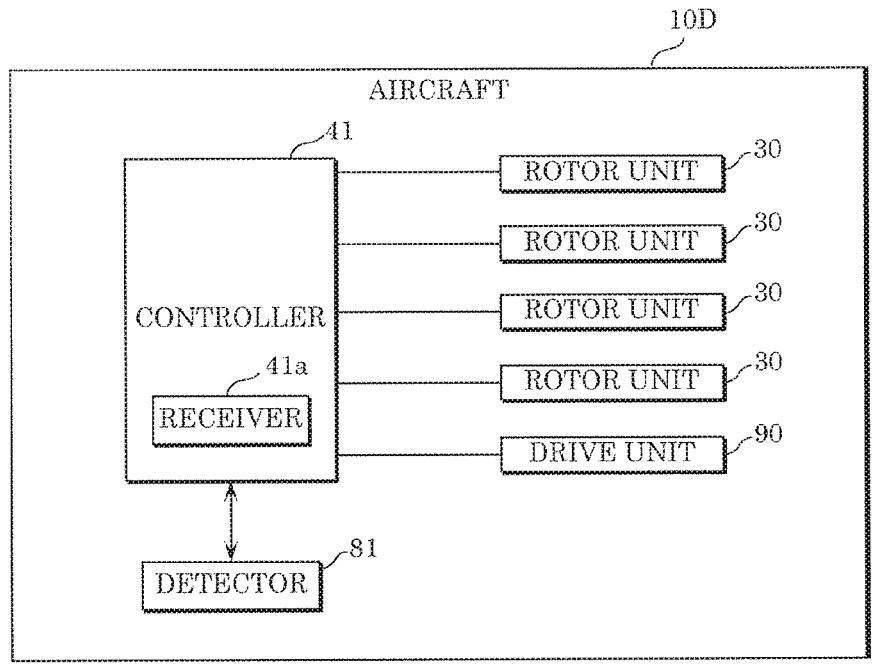
FIG. 20 is a block diagram illustrating a configuration of the aircraft according to Embodiment 3.
Figure 21A:
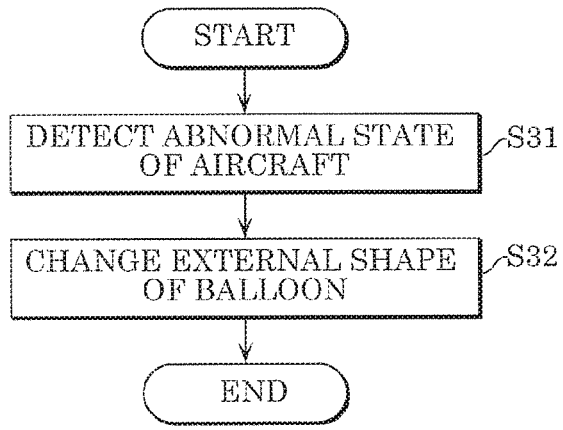
FIG. 21A is a flow chart of one example of the shape-change control performed by the drive unit in the aircraft according to Embodiment 3.
Figure 21B:
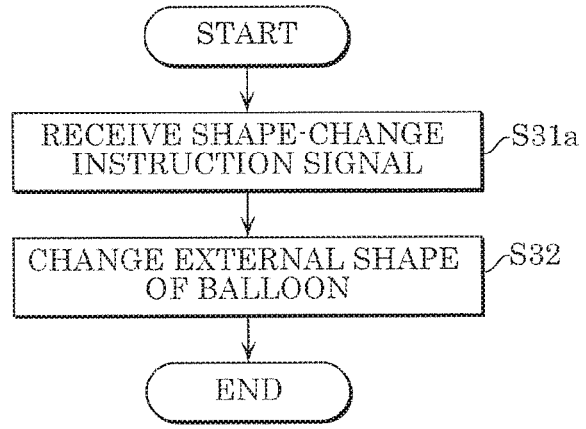
FIG. 21B is a flow chart of another example of the shape-change control performed by the drive unit in the aircraft according to Embodiment 3.

FIG. 20 is a block diagram illustrating a configuration of aircraft 10D according to Embodiment 3. FIG. 21A is a flow chart of one example of the shape-change control performed by drive unit 90 in aircraft 10D according to Embodiment 3. FIG. 21B is a flow chart of another example of the shape-change control performed by drive unit 90 in aircraft 10D according to Embodiment 3.

Aircraft 10D according to Embodiment 3 differs from aircraft 10C according to Variation 2 of Embodiment 2 in that it includes arms 52C instead of holding components 54B. The remaining components in aircraft 10D according to Embodiment 3 are the same as in aircraft 10 according to Embodiment 1.

Controller 41 contracts the plurality of arms 52C at a predetermined timing. Drive unit 90 changes the external shape of balloon 20 as a result of the plurality of arms 52C contracting.

In aircraft 10D having the configuration described above, the shape-change control may be implemented via, for example, the information processing and operations illustrated in FIG. 21A. In other words, detector 81 detects the state of aircraft 10D (S31). Controller 41 changes the external shape of balloon 20 in accordance with the result of the detection by detector 81 (S32). In other words, with the shape-change control illustrated in FIG. 21A, controller 41 changes the external shape of balloon 20 when, as the predetermined timing, the distance detected by detector 81 is less than a predetermined distance.

In aircraft 10D having the configuration described above, the shape-change control may be implemented via, for example, the information processing and operations illustrated in FIG. 21B. In other words, receiver 41a receives a shape-change instruction signal transmitted from the radio control device (S31a). Controller 41 changes the external shape of balloon 20 when, as the predetermined timing, receiver 41a receives the shape-change instruction signal (S32). In other words, in the shape-change control illustrated in FIG. 21B, controller 41 changes the external shape of balloon 20 when, as the predetermined timing, receiver 41a receives the shape-change instruction signal, which instructs the changing of the external shape of balloon 20.

As a result of the shape-change control described with reference to FIG. 21A and FIG. 21B being performed, the plurality of arms 52C contract, which causes the external shape of balloon 20 to change, as illustrated in FIG. 19. This makes it possible to house camera 44 in recess 29 of balloon 20 at a predetermined timing.

(Advantageous Effects, Etc., of Embodiment 3)

Aircraft 10D according to this embodiment includes: a plurality of rotor units 30 each including propeller 32 and motor 33 that drives propeller 32; balloon 20 that laterally covers the plurality of rotor units 30, across a height of the plurality of rotor units 30 in an up-and-down direction; and a plurality of arms 52C that are driven by drive unit 90 to change the external shape of balloon 20 at a predetermined timing.

With this configuration, since the external shape of balloon 20 can be changed at a predetermined timing, when, for example, aircraft 10D encounters an unexpected flight situation, the external shape of balloon 20 can be changed such that an on-board device, such as camera 44, does not protrude beyond balloon 20, making it possible to inhibit the on-board device(s) from impacting an object. Moreover, for example, by changing the external shape of external shape balloon 20 of aircraft 10D, aircraft 10D can be used for entertainment purposes.

In this embodiment, aircraft 10D further includes camera 44 that protrudes beyond balloon 20, and drive unit 90 changes the external shape of balloon 20 such that a part or all of camera 44 does not protrude beyond balloon 20. In other words, when, for example, aircraft 10D encounters an unexpected flight situation, the external shape of balloon 20 can be changed such that camera 44, which is protruding beyond balloon 20, no longer protrudes beyond balloon 20. As such, even if aircraft 10D contacts an object, camera 44 can be effectively inhibited from directly contacting the object. Accordingly, even if aircraft 10D, for example, encounters an unexpected flight situation and contacts an object, camera 44 and/or the object can be prevented from being damaged.

In this embodiment, drive unit 90 changes the external shape of balloon 20 by causing at least part of the external shape of balloon 20 to protrude beyond camera 44. In other words, when, for example, aircraft 10D encounters an unexpected flight situation, the external shape of balloon 20 can be changed such that camera 44, which is protruding beyond balloon 20, no longer protrudes beyond a part of balloon 20. As such, even if aircraft 10D contacts an object, balloon 20 will contact the object before camera 44 does. Accordingly, even if aircraft 10D, for example, encounters an unexpected flight situation and contacts an object, camera 44 can be prevented from being damaged.

In this embodiment, drive unit 90 changes the external shape of balloon 20 by causing at least part of balloon 20, in a surrounding area of camera 44, to protrude beyond camera 44. In other words, when, for example, aircraft 10D encounters an unexpected flight situation, the external shape of balloon 20, in an area surrounding an on-board device, such as camera 44, can be changed such that the on-board device does not protrude beyond a part of balloon 20. As such, even if aircraft 10D contacts an object in any sort of orientation, balloon 20 will contact the object before the on-board device does. Accordingly, even if aircraft 10D, for example, encounters an unexpected flight situation and contacts an object, the on-board device and/or object can be prevented from being damaged.

In this embodiment, aircraft 10D further includes detector 81 functioning as the distance measuring unit that measures the distance to an object below aircraft 10D. Moreover, the predetermined timing is when the distance measured by detector 81 is less than a predetermined distance. Furthermore, drive unit 90 changes the external shape of balloon 20 when the distance measured by detector 81 is less than the predetermined distance.

In this way, controller 41 can automatically contract the plurality of arms 52C when, as the predetermined timing, the distance to an object below aircraft 10D is less than the predetermined distance. With this, when aircraft 10D contacts an object, an on-board device, such as camera 44, can be housed within balloon 20 so as not to protrude beyond balloon 20, since it is possible to change the external shape of balloon 20 to its post-change form. This makes it possible to inhibit an on-board device from contacting an object and prevent damage to the on-board device and/or the object.

In this embodiment, aircraft 10D further includes receiver 41a that receives a signal. Moreover, the predetermined timing is when receiver 41a receives a shape-change instruction signal, which instructs the changing of the external shape of balloon 20. Furthermore, the plurality of arms 52C change the external shape of balloon 20 when receiver 41a receives the shape-change instruction signal.

As such, for example, controller 41 can contract the plurality of arms 52C as a result of the operator using the radio control device to transmit the shape-change instruction signal. With this, as a result of the operator shortening the overall length of the plurality of arms 52C at a predetermined timing, an on-board device can be housed within balloon 20 so as not to protrude beyond balloon 20, even when aircraft 10D is flying. This makes it possible to inhibit an on-board device from contacting an object and prevent damage to the on-board device and/or the object.

The overall lengths of the plurality of arms 52C are shortened at a predetermined timing. Thereafter, the plurality of arms 52C may be extended at a different timing. In other words, the plurality of arms 52C are variable-length components capable of contracting and extending. The plurality of arms 52C are connected to ventilation holes 22 in four locations inside balloon 20, and change the external shape of balloon 20 by pulling ventilation holes 22 closer together or pushing them farther apart.

Variations of Embodiment 3

Variation 1

Figure 22:
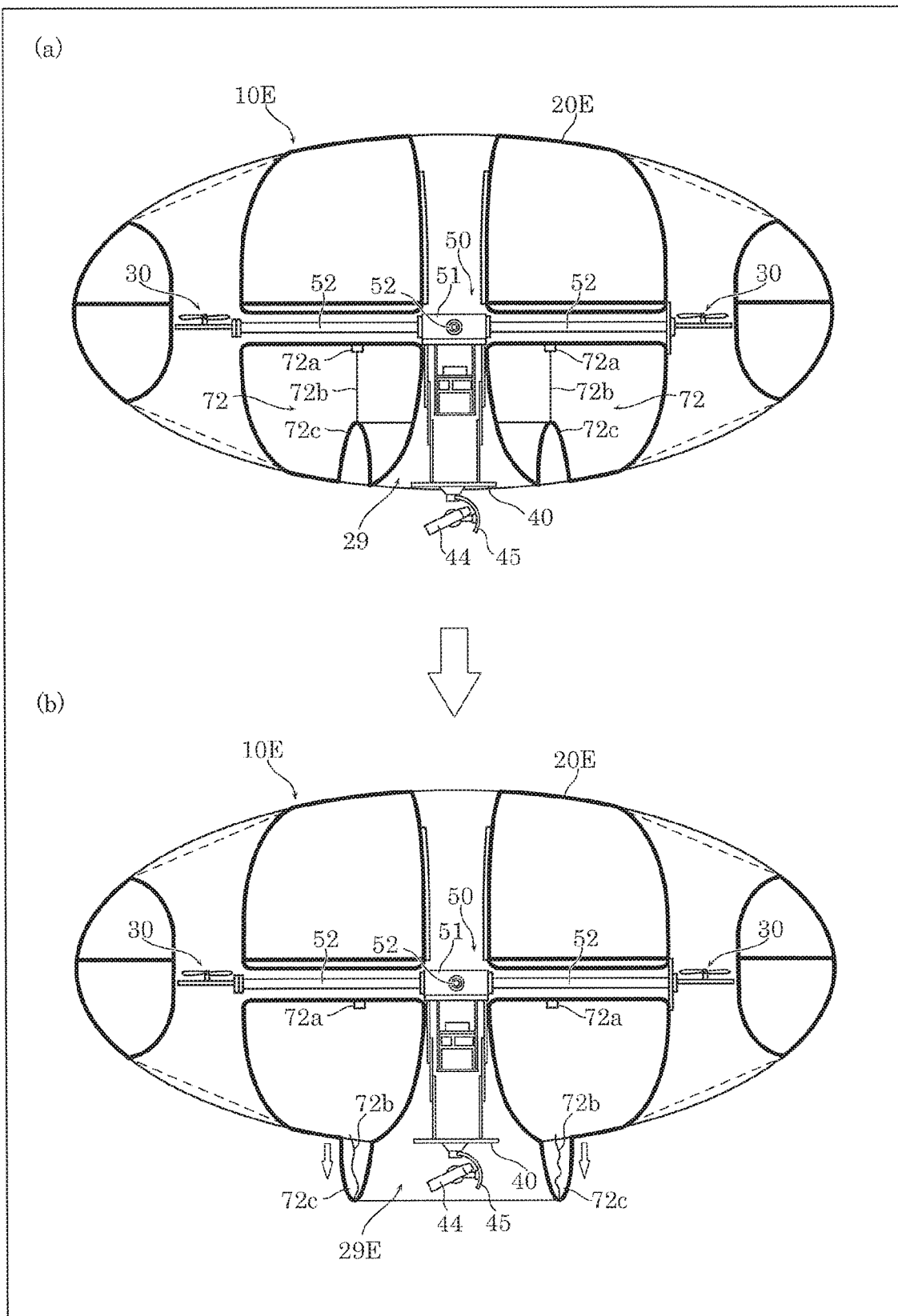
FIG. 22 illustrates an aircraft according to Variation 1 of Embodiment 3 when the shape-change control is performed.

In aircraft 10D according to Embodiment 3 described above, drive unit 90 is exemplified as, but not limited to, changing the external shape of balloon 20 by contracting the plurality of arms 52C included in fixing component 50C; for example, the configuration illustrated in FIG. 22 may be implemented.

FIG. 22 illustrates aircraft 10E according to Variation 1 of Embodiment 3 when shape-change control is performed. Note that (a) in FIG. 22 illustrates aircraft 10E before the shape-change control is performed, and corresponds to the cross section as illustrated in FIG. 3. Note that (b) in FIG.

22 illustrates the overall state of aircraft 10E after the shape-change control has been performed.

Aircraft 10E according to Variation 1 of Embodiment 3 differs from aircraft 10D according to Embodiment 3 in that it includes external shape changing unit 72, as illustrated in FIG. 22.

External shape changing unit 72 includes connectors 72*a*, string-like components 72*b*, and recessed region 72*c* in which part of the external shape of balloon 20E is recessed.

Connectors 72*a* are located in the central region of the inside of balloon 20E. Each connector 72*a* is connected to one end of a string-like component 72*b*. Connectors 72*a* severs one end of each string-like component 72*b* by disconnecting string-like components 72*b* upon being driven by drive unit 90 having received a shape-change command from controller 41.

String-like components 72*b* each have one end connected to a connector 72*a* and the other end connected to the part of balloon 20E corresponding to the base of recessed region 72*c*. In other words, the shape of recessed region 72*c* is maintained by string-like components 72*b* connecting the base of recessed region 72*c* to another part of balloon 20E, inside balloon 20E, via connectors 72*a*.

In aircraft 10E configured in this manner, drive unit 90 disconnects connectors 72*a* at a predetermined timing to cause recessed region 72*c* to protrude beyond camera 44 via the internal pressure of balloon 20E, as illustrated in (b) in FIG. 22. This causes recess 29 of balloon 20E to protrude from an area surrounding camera 44 to form recess 29E that surrounds the entire perimeter of camera 44. Accordingly, with a simple configuration, part of balloon 20E can be caused to protrude beyond an on-board device, such as camera 44, at a predetermined timing.

Variation 2

Figure 23:
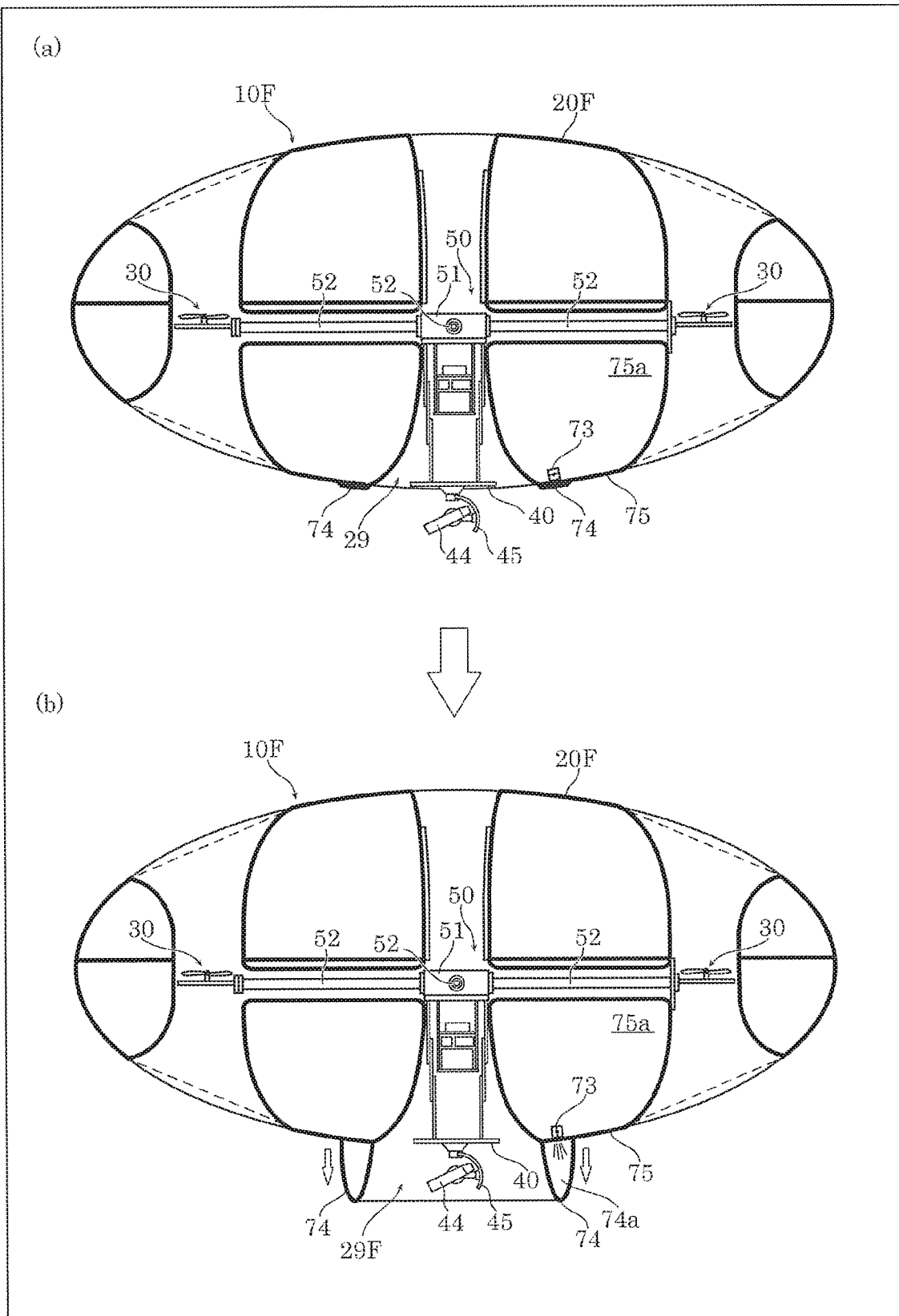
FIG. 23 illustrates an aircraft according to Variation 2 of Embodiment 3 when the shape-change control is performed.

For example, instead of the configuration described in Variation 1, the configuration illustrated in FIG. 23 may be implemented.

FIG. 23 illustrates aircraft 10F according to Variation 2 of Embodiment 3 when shape-change control is performed. Note that (a) in FIG. 23 illustrates aircraft 10F before the shape-change control is performed, and corresponds to the cross section as illustrated in FIG. 3. Note that (b) in FIG. 23 illustrates the overall state of aircraft 10F after the shape-change control has been performed.

Aircraft 10F according to Variation 2 of Embodiment 3 differs in that it includes gas supply unit 73, as illustrated in FIG. 23. Aircraft 10F also differs in that balloon 20F includes first region 75 that is inflated and second region 74 that is deflated.

Gas supply unit 73 is capable of supplying gas to second region 74. More specifically, gas supply unit 73 is a valve that is disposed between first region 75 and second region 74 and selectively places first space 75*a* defined by first region 75 in fluid communication with second space 74*a* that second region 74 is capable of defining.

Drive unit 90 supplies gas contained in first space 75*a* to second region 74 by opening gas supply unit 73 at a predetermined timing. In other words, at a predetermined timing, drive unit 90 causes gas supply unit 73 to inflate second region 74 by supplying gas to second region 74, which causes second region 74 to protrude from balloon 20F.

In aircraft 10F configured in this manner, at a predetermined timing, drive unit 90 opens gas supply unit 73 to cause second region 74 to protrude beyond camera 44, using the gas filling balloon 20F, as illustrated in (b) in FIG. 23. This causes recess 29 of balloon 20F to protrude from an area surrounding camera 44 to form recess 29F that surrounds the entire perimeter of camera 44. Accordingly, with a simple configuration, part of balloon 20F can be caused to protrude beyond an on-board device at a predetermined timing.

Variation 3

Figure 24:
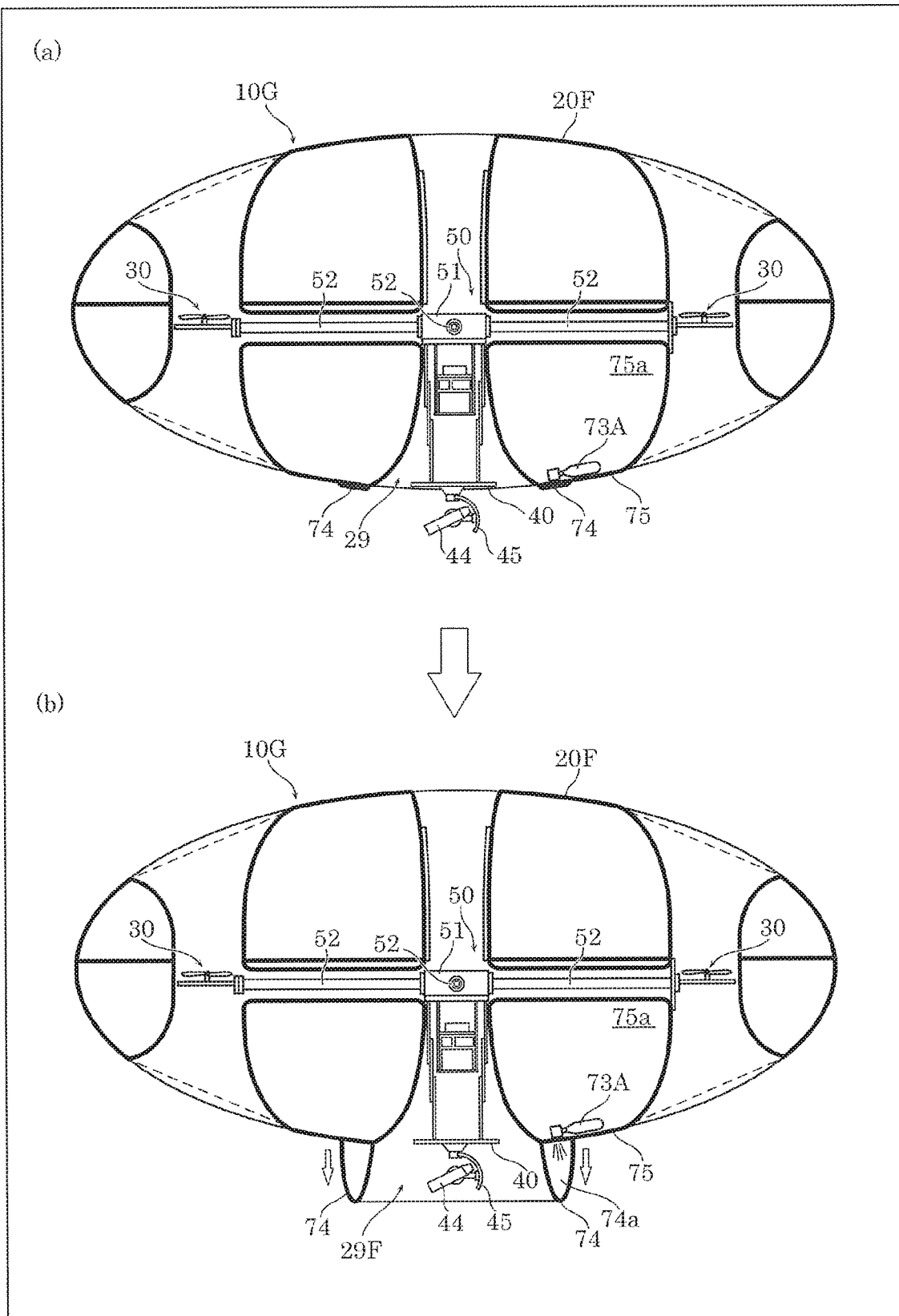
FIG. 24 illustrates an aircraft according to Variation 3 of Embodiment 3 when the shape-change control is performed.

In Variation 2, gas supply unit 73 is exemplified as a valve, but as illustrated in FIG. 24, may be implemented as gas supply unit 73A configured as a canister filled with gas.

FIG. 24 illustrates aircraft 10G according to Variation 3 of Embodiment 3 when shape-change control is performed. Note that (a) in FIG. 24 illustrates aircraft 10G before the shape-change control is performed, and corresponds to the cross section as illustrated in FIG. 3. Note that (b) in FIG. 24 illustrates the overall state of aircraft 10G after the shape-change control has been performed.

Aircraft 10G according to Variation 3 of Embodiment 3 differs in that it includes gas supply unit 73A instead of gas supply unit 73, as illustrated in FIG. 24.

Drive unit 90 supplies gas from gas supply unit 73A to second region 74 at a predetermined timing. In other words, at a predetermined timing, drive unit 90 causes gas supply unit 73A to inflate second region 74 by supplying gas to second region 74, which causes second region 74 to protrude from balloon 20F.

In aircraft 10G configured in this manner, at a predetermined timing, drive unit 90 supplies gas filled in gas supply unit 73A to cause second region 74 to protrude beyond camera 44, as illustrated in (b) in FIG. 24. This causes recess 29 of balloon 20F to protrude from an area surrounding camera 44 to form recess 29F that surrounds the entire perimeter of camera 44. Accordingly, with a simple configuration, part of balloon 20F can be caused to protrude beyond an on-board device at a predetermined timing.

Variation 4

Figure 25:
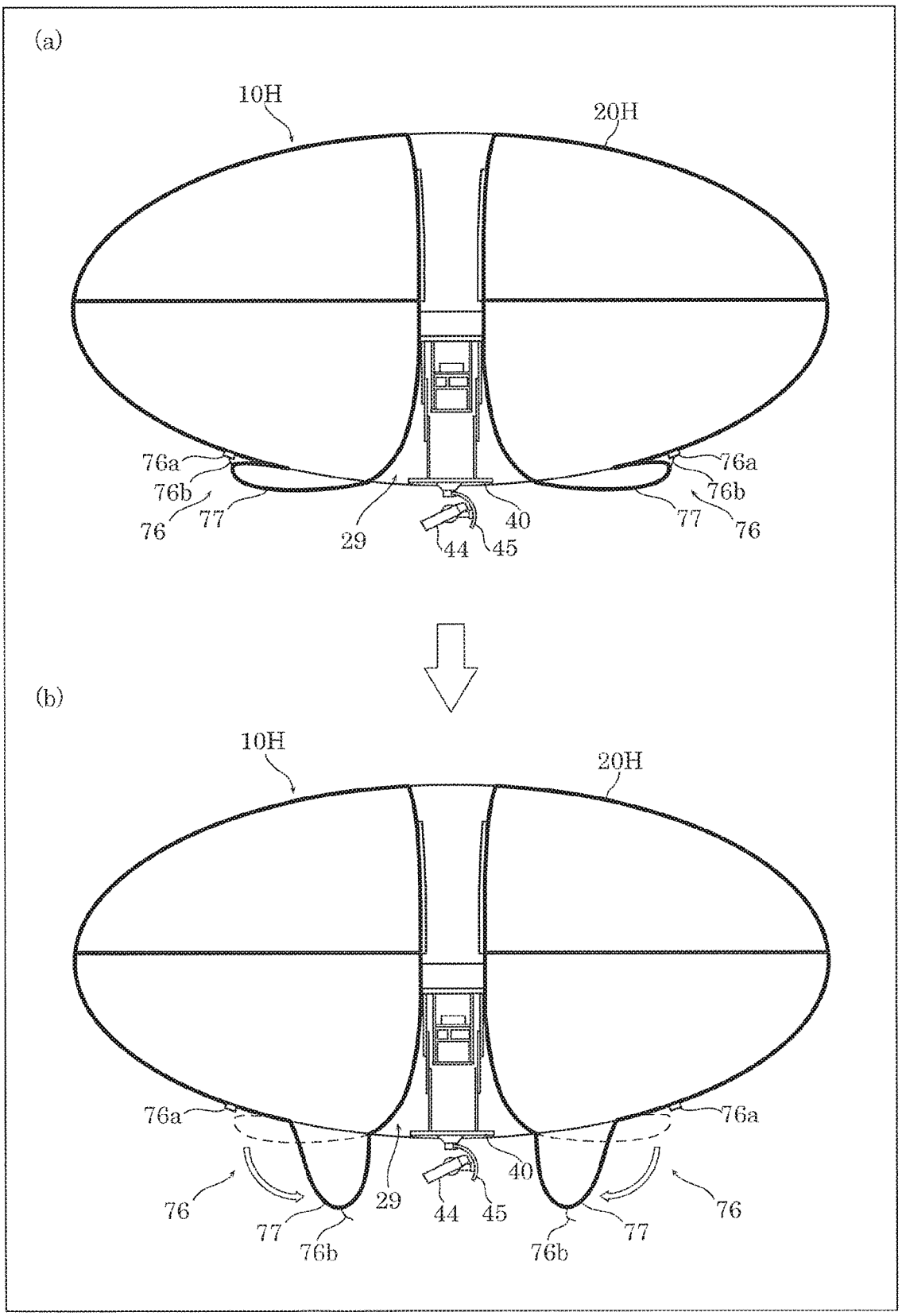
FIG. 25 illustrates an aircraft according to Variation 4 of Embodiment 3 when the shape-change control is performed.

For example, instead of the configurations described in Variations 1 through 4, the configuration illustrated in FIG. 25 may be implemented.

FIG. 25 illustrates aircraft 10H according to Variation 4 of Embodiment 3 when shape-change control is performed. Note that (a) in FIG. 25 illustrates aircraft 10H before the shape-change control is performed, and corresponds to the cross section as illustrated in FIG. 4. Note that (b) in FIG. 25 illustrates the overall state of aircraft 10H after the shape-change control has been performed.

Aircraft 10H according to Variation 4 of Embodiment 3 differs in that it includes external shape changing unit 76, as illustrated in FIG. 25.

External shape changing unit 76 includes connectors 76*a*, string-like components 76*b*, and protruding region 77 in which part of the external shape of balloon 20H is protruding.

Connectors 76*a* are located on the outer surface of balloon 20H. Each connector 76*a* is connected to one end of a string-like component 76*b*. Connectors 76*a* each sever one end of a string-like component 76*b* by disconnecting string-like component 72*b* upon being driven by drive unit 90 having received a shape-change command from controller 41.

String-like components 76*b* each have one end connected to a connector 76*a* and the other end connected to a distal end of protruding region 77 of balloon 20H. With this, protruding region 77 has a distal end that connects to part of the outer surface of balloon 20H via connector 76*a* to give protruding region 77 a shape that follows the contour of the outer surface of balloon 20H.

In aircraft 10H configured in this manner, drive unit 90 disconnects connectors 76a at a predetermined timing to cause protruding region 77 to protrude beyond camera 44 via the internal pressure of balloon 20H, as illustrated in (b) in FIG. 25. Accordingly, with a simple configuration, part of balloon 20H can be caused to protrude beyond an on-board device, such as camera 44, at a predetermined timing.

Variation 5

In Embodiment 3 described above, the external shape of balloon 20 is changed by contracting plurality of arms 52C, but this example is not limiting. For example, cord-like components may be attached in two different locations, and the cord-like components may be reeled in with a reel to bring the two different locations closer together. This makes it possible to change the external shape of balloon 20 with a simple configuration.

Other Embodiments

The embodiments described above include fixing component 50, 50C, but fixing component 50, 50C may be omitted. In such cases, the plurality of rotor units 30 are fixed directly to ventilation holes 22. Moreover, the balloon need not include the plurality of ducts 28.

The above embodiments have been presented as examples of techniques according to the present disclosure. The accompanying drawings and the detailed description are provided for this purpose.

Therefore, the components described in the accompanying drawings and the detailed description include, in addition to components essential to overcoming problems, components that are not essential to overcoming problems but are included in order to exemplify the techniques described above. Thus, those non-essential components should not be deemed essential due to the mere fact that they are illustrated in the accompanying drawings and described in the detailed description.

The above embodiments are for providing examples of the techniques according to the present disclosure, and thus various modifications, substitutions, additions, and omissions are possible in the scope of the claims and equivalent scopes thereof.

INDUSTRIAL APPLICABILITY

The present disclosure is applicable to an aircraft including a plurality of rotor units and a shock absorber.

What is claimed is:

1. An aircraft, comprising:
a plurality of rotor units each including a propeller and a motor that drives the propeller;
a shock absorber that laterally covers the plurality of rotor units;
a camera for capturing aerial video;
a holding component that holds the camera and is variable in overall length along an up-and-down axis;
a controller comprising a computer that changes the overall length of the holding component by driving the holding component; and
a distance measuring unit configured to measure a distance to an object below the aircraft, wherein:
the shock absorber includes a recess having a size such that the recess houses the camera,
the overall length of the holding component is variable to a first position at which the camera is housed in the recess and a second position at which the camera protrudes beyond the shock absorber along the up-and-down axis, and
the controller:
causes the distance measurement unit to measure the distance, and
shortens the overall length of the holding component when the holding component is in the second position and the distance measured by the distance measuring unit is less than a predetermined distance, such that the camera is housed in the recess not to contact the object.

2. The aircraft according to claim 1, wherein
the holding component is flexible, and when the camera is pushed along the up-and-down axis, contracts.

3. The aircraft according to claim 1, further comprising:
a receiver that receives a signal,
wherein when the holding component is at the second position and the receiver receives a length-change instruction signal instructing that the overall length of the holding component be changed,
the computer is further configured to shorten the overall length of the holding component so that the holding component is at the first position.

4. The aircraft according to claim 1, wherein
the shock absorber laterally covers the plurality of rotor units, across a height of the plurality of rotor units in the up-and-down axis.

5. The aircraft according to claim 1, wherein the holding component includes a disc and a gimbal and the camera is attached to a bottom surface of the disc via the gimbal such that the camera is angled diagonally with respect to the up-and-down axis.

6. An aircraft, comprising:
a plurality of rotor units each including a propeller and a motor that drives the propeller;
a shock absorber that laterally covers the plurality of rotor units;
a camera for capturing aerial video an on-board device that protrudes, along a predetermined axis, beyond the shock absorber;
a holding component that holds the camera and is variable in overall length along the predetermined axis;
a distance measuring unit configured to measure a distance to an object below the aircraft; and
a controller comprising a computer, wherein:
the shock absorber includes a recess having a size such that the recess houses the camera,
the overall length of the holding component is variable to a first position at which the camera is housed in the recess and a second position at which the camera protrudes beyond the shock absorber along the downward axis, and
the computer is programmed to:
cause the distance measurement unit to measure the distance, and
shorten the overall length of the holding component, when the holding component is at the second position and the distance measured by the distance measuring unit is less than a predetermined distance, such that the camera is housed in the recess not to contact the object.

7. The aircraft according to claim 6, wherein the holding component is flexible, and when the camera is pushed along the up-and-down axis, contracts.

8. The aircraft according to claim 6, further comprising:
a receiver that receives a signal,
wherein when the holding component is at the second position and the receiver receives a length-change instruction signal instructing that the overall length of the holding component be changed, the computer is further programmed to shorten the overall length of the holding component so that the holding component is at the first position.

9. The aircraft according to claim 6, wherein the shock absorber laterally covers the plurality of rotor units, across a height of the plurality of rotor units in the up-and-down axis.

10. The aircraft according to claim 6, wherein the holding component includes a disc and a gimbal and the camera is attached to a bottom surface of the disc via the gimbal such that the camera is angled diagonally with respect to the downward axis.

11. A method, comprising:
providing an aircraft comprising:
    a plurality of rotor units each including a propeller and a motor that drives the propeller;
    a shock absorber that laterally covers the plurality of rotor units;
    a camera for capturing aerial video;
    a holding component that holds the camera and is variable in overall length along a downward axis; and
    a distance measuring unit configured to measure a distance to an object below the aircraft, wherein:
    the shock absorber includes a recess having a size such that the recess houses the camera,
    the overall length of the holding component is variable to a first position at which the camera is housed in the recess and a second position at which the camera protrudes beyond the shock absorber along the downward axis;
measuring the distance by the distance measuring unit; and
shortening the overall length of the holding component, when the holding component is in the second position and the distance measured by the distance measuring unit is less than a predetermined distance, such that the camera is housed in the recess not to contact the object.

12. The method according to claim 11, wherein the holding component is flexible, and when the camera is pushed along the downward axis, contracts.

13. The method according to claim 11, wherein, the method further comprises, when the holding component is at the second position and a length-change instruction signal instructing that the overall length of the holding component be changed is received by the aircraft, shortening the overall length of the holding component so that the holding component is at the first position.

14. The method according to claim 11, wherein the shock absorber laterally covers the plurality of rotor units, across a height of the plurality of rotor units in the up-and-down axis.

15. The method according to claim 11, wherein the holding component includes a disc and a gimbal and the camera is attached to a bottom surface of the disc via the gimbal such that the camera is angled diagonally with respect to the downward axis.

* * * * *